(12) United States Patent
Yamazaki

(10) Patent No.: US 12,023,870 B2
(45) Date of Patent: Jul. 2, 2024

(54) THREE-DIMENSIONAL SHAPED ARTICLE PRODUCTION METHOD, THREE-DIMENSIONAL SHAPING APPARATUS, AND INFORMATION PROCESSING APPARATUS

(71) Applicant: SEIKO EPSON CORPORATION, Tokyo (JP)

(72) Inventor: Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 378 days.

(21) Appl. No.: 17/510,449

(22) Filed: Oct. 26, 2021

(65) Prior Publication Data

US 2022/0126522 A1   Apr. 28, 2022

(30) Foreign Application Priority Data

Oct. 28, 2020   (JP) ................ 2020-180081

(51) Int. Cl.
*B33Y 50/02*   (2015.01)
*B29C 64/118*   (2017.01)
(Continued)

(52) U.S. Cl.
CPC .......... *B29C 64/393* (2017.08); *B29C 64/118* (2017.08); *B29C 64/236* (2017.08);
(Continued)

(58) Field of Classification Search
CPC ... B29C 64/393; B29C 64/118; B29C 64/236; B29C 64/209; B29C 64/245;
(Continued)

(56) References Cited

U.S. PATENT DOCUMENTS 6,823,230 B1 * 11/2004 Jamalabad ......... G05B 19/4099
                                                              700/182
2007/0179657 A1   8/2007 Holzwarth
(Continued)

FOREIGN PATENT DOCUMENTS

JP   2009-525207 A   7/2009
WO   2017/094791 A1   6/2017

OTHER PUBLICATIONS

G.Q. Jin, W.D. Li, C.F. Tsai, L. Wang, Adaptive tool-path generation of rapid prototyping for complex product models, Journal of Manufacturing Systems, vol. 30, Issue 3, 2011, pp. 154-164 (Year: 2011).*

(Continued)

*Primary Examiner* — Christopher E. Everett
(74) *Attorney, Agent, or Firm* — Global IP Counselors, LLP

(57) ABSTRACT

A three-dimensional shaped article production method includes a first step of dividing a gap region that is a gap region sandwiched by multiple partial paths and includes one or multiple concave shapes at an outer circumference based on first data having path data representing a path in which an ejection section moves while ejecting a shaping material by multiple partial paths, and having ejection control data including at least either of ejection amount information representing an ejection amount of the shaping material in each of the partial paths and moving speed information representing a moving speed of the ejection section in each of the partial paths, a second step of generating second data from the first data by changing at least either of the path data and the ejection control data so as to fill up the divided gap region with the shaping material, and a third step of shaping the three-dimensional shaped article by controlling the ejection section according to the second data.

16 Claims, 21 Drawing Sheets

(51) Int. Cl.
*B29C 64/236* (2017.01)
*B29C 64/393* (2017.01)
*B33Y 10/00* (2015.01)
*B33Y 30/00* (2015.01)

(52) U.S. Cl.
CPC ............... *B33Y 10/00* (2014.12); *B33Y 30/00* (2014.12); *B33Y 50/02* (2014.12)

(58) Field of Classification Search
CPC ......... B33Y 10/00; B33Y 30/00; B33Y 50/02; B22F 2998/00; B22F 10/30; B22F 2999/00; B22F 10/18; Y02P 10/25
See application file for complete search history.

(56) References Cited

U.S. PATENT DOCUMENTS

| | | | |
|---|---|---|---|
| 2017/0173884 A1* | 6/2017 | Ryan | B29C 64/118 |
| 2017/0266884 A1* | 9/2017 | Maeda | H04N 1/4092 |
| 2018/0264742 A1 | 9/2018 | Yang et al. | |
| 2018/0297272 A1* | 10/2018 | Preston | B33Y 50/02 |
| 2022/0043430 A1* | 2/2022 | Iriguchi | G05B 19/41865 |

OTHER PUBLICATIONS

Xiong, Y., Park, Sl., Padmanathan, S. et al. Process planning for adaptive contour parallel toolpath in additive manufacturing with variable bead width. Int J Adv Manuf Technol 105, 4159-4170 (2019) (Year: 2019).*

\* cited by examiner

THREE-DIMENSIONAL SHAPED ARTICLE PRODUCTION METHOD, THREE-DIMENSIONAL SHAPING APPARATUS, AND INFORMATION PROCESSING APPARATUS

The present application is based on, and claims priority from JP Application Serial Number 2020-180081, filed Oct. 28, 2020, the disclosure of which is hereby incorporated by reference herein in its entirety.

BACKGROUND

1. Technical Field

The present disclosure relates to a three-dimensional shaped article production method, a three-dimensional shaping apparatus, and an information processing apparatus.

2. Related Art

With respect to a three-dimensional shaped article production method, for example, JP-T-2009-525207 (Patent Document 1) describes that a nozzle that performs extrusion of a shaping material is moved according to a build path for building each layer of a three-dimensional shaped article. In the build path, a circumferential path, a bulk raster path, and a remnant path are included. The circumferential path is a path for forming a boundary between the three-dimensional shaped article and the outside, and the bulk raster path is a path for filling up a region surrounded by the circumferential path. In the technique described in Patent Document 1, a porosity is decreased by filling up a void region that cannot be filled up by the circumferential path and the bulk raster path by the remnant path.

When the void region is filled up by the remnant path as the technique described in Patent Document 1, an additional remnant path is not well generated depending on the shape of the void region, and a void portion may sometimes remain.

SUMMARY

According to a first aspect of the present disclosure, a three-dimensional shaped article production method for producing a three-dimensional shaped article by ejecting a shaping material to a stage from an ejection section and stacking layers is provided. The production method includes a first step of dividing a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, a second step of generating second data from the first data by changing at least either of the path data and the ejection control data so as to fill up the divided gap region with the shaping material, and a third step of shaping the three-dimensional shaped article by controlling the ejection section according to the second data.

According to a second aspect of the present disclosure, a three-dimensional shaping apparatus is provided. The three-dimensional shaping apparatus includes a stage, an ejection section that ejects a shaping material to the stage, a moving mechanism that moves the ejection section with respect to the stage, a data generating section that generates second data from first data, and a control unit that controls the ejection section and the moving mechanism so as to shape a three-dimensional shaped article on the stage according to the second data, wherein the data generating section divides a gap region that is a gap region sandwiched by multiple partial paths and includes one or multiple concave shapes at an outer circumference based on the first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, and generates the second data from the first data by changing at least either of the path data and the ejection control data so as to fill up the divided gap region with the shaping material.

According to a third aspect of the present disclosure, an information processing apparatus for generating shaping data for ejecting a shaping material to a stage from an ejection section and stacking layers is provided. The information processing apparatus includes a data generating section that divides a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, and generates the shaping data from the first data by changing at least either of the path data and the ejection control data so as to fill up the divided gap region with the shaping material.

DESCRIPTION OF EXEMPLARY EMBODIMENTS

A. First Embodiment

Figure 1:
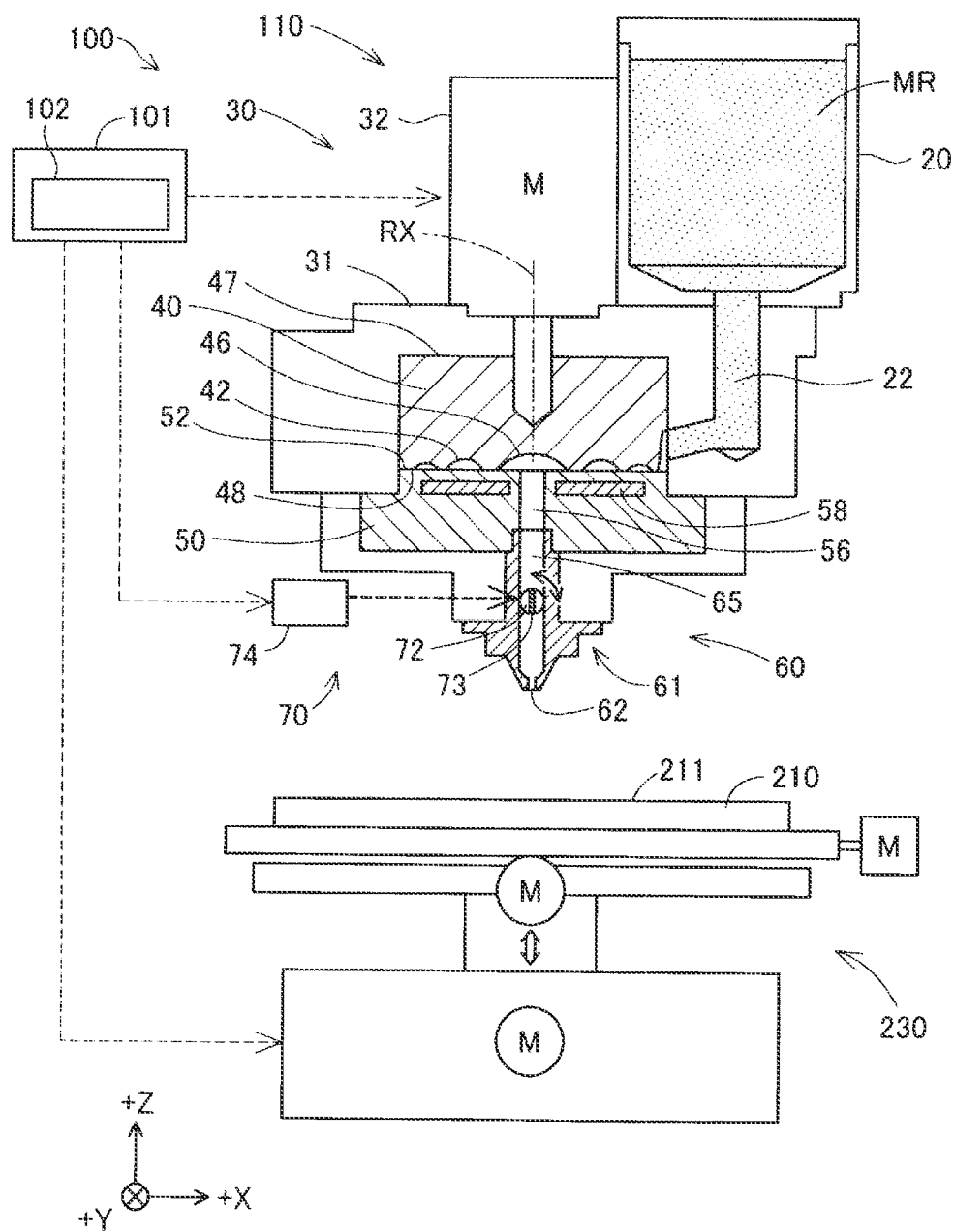
FIG. 1 is an explanatory view showing a schematic configuration of a three-dimensional shaping apparatus.

FIG. 1 is an explanatory view showing a schematic configuration of a three-dimensional shaping apparatus 100 in a first embodiment. In FIG. 1, arrows indicating X, Y, and Z directions orthogonal to one another are shown. The X direction and the Y direction are directions parallel to a horizontal plane, and the Z direction is a direction opposite to the gravity direction. The arrows indicating the X, Y, and Z directions are shown as appropriate also in other drawings so that the directions shown in the drawings correspond to those in FIG. 1. In the following description, when the direction is specified, the positive direction is denoted by "+", and the negative direction is denoted by "−", and the plus and minus signs are used together with the indication of the direction.

The three-dimensional shaping apparatus 100 includes a control unit 101 that controls the three-dimensional shaping apparatus 100, a shaping section 110 that forms and ejects a shaping material, a stage 210 for shaping to serve as a base stand for a three-dimensional shaped article, and a moving mechanism 230 that controls an ejection position of the shaping material.

The shaping section 110 melts a material in a solid state to form a shaping material in a paste form and ejects the shaping material onto the stage 210 under the control of the control unit 101. The shaping section 110 includes a material supply section 20 that is a supply source of the material before being transformed into the shaping material, a shaping material forming section 30 that transforms the material into the shaping material, and an ejection section 60 that ejects the shaping material.

The material supply section 20 supplies a raw material MR for forming the shaping material to the shaping material forming section 30. The material supply section 20 is, for example, constituted by a hopper that stores the raw material MR. The material supply section 20 has a discharge port below. The discharge port is coupled to the shaping material forming section 30 through a communication channel 22. The raw material MR is fed to the material supply section 20 in the form of a pellet, a powder, or the like. In this embodiment, a material of an ABS resin in a pellet form is used.

The shaping material forming section 30 melts the raw material MR supplied from the material supply section 20 so as to form the shaping material in a paste form exhibiting fluidity and guides the shaping material to the ejection section 60. The shaping material forming section 30 includes a screw case 31, a driving motor 32, a flat screw 40, and a screw opposed section 50. The flat screw 40 is also referred to as "rotor" or "scroll", and the screw opposed section 50 is also referred to as "barrel".

Figure 2:
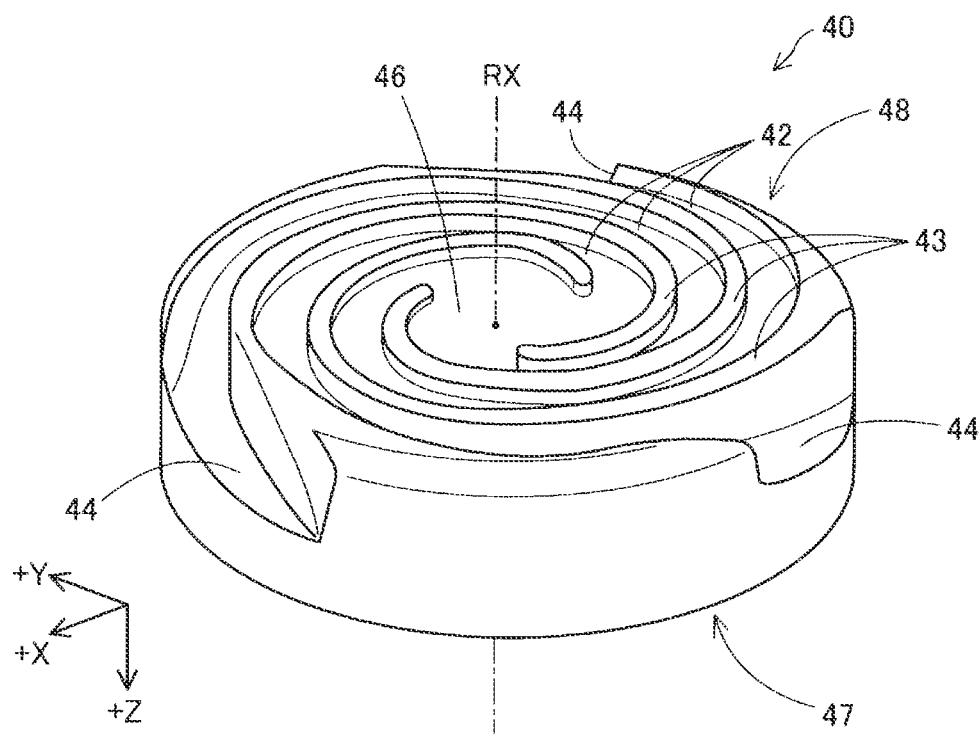
FIG. 2 is a perspective view showing a schematic configuration of a flat screw.
Figure 3:
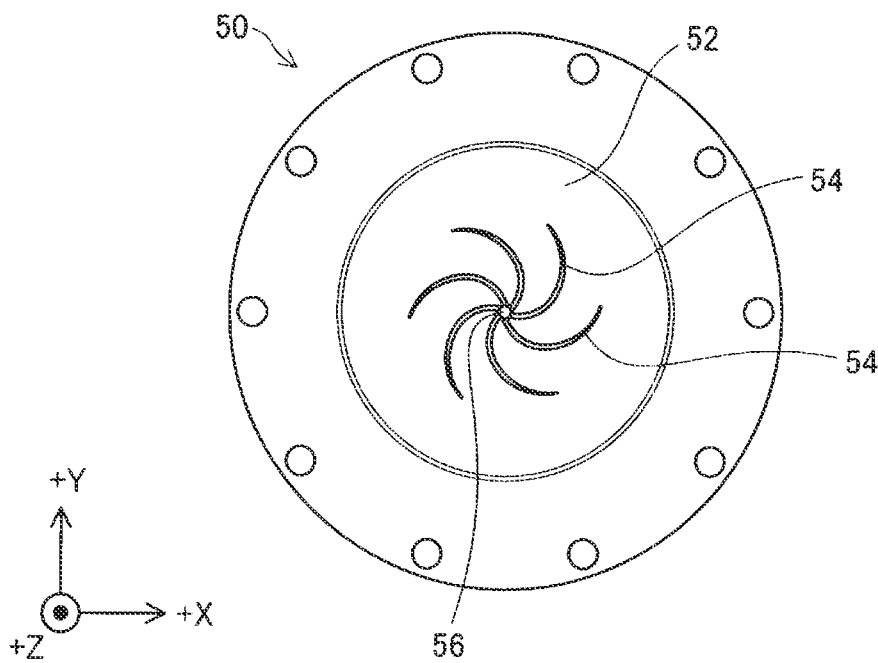
FIG. 3 is a schematic plan view of a screw opposed section.

FIG. 2 is a perspective view showing a schematic configuration of the flat screw 40 at a lower face 48 side. The flat screw 40 shown in FIG. 2 is shown in a state where the positional relationship between an upper face 47 and a lower face 48 shown in FIG. 1 is reversed in a vertical direction for facilitating the understanding of the technique. FIG. 3 is a schematic plan view showing the screw opposed section 50 at an upper face 52 side. The flat screw 40 has a substantially columnar shape in which a height in an axial direction that is a direction along a central axis thereof is smaller than a diameter. The flat screw 40 is disposed so that a rotational axis RX to serve as the center of rotation is parallel to the Z direction.

The flat screw 40 is stored in the screw case 31. The flat screw 40 at the upper face 47 side is coupled to the driving motor 32, and the flat screw 40 is rotated in the screw case 31 by a rotational driving force generated by the driving motor 32. The driving motor 32 drives under the control of the control unit 101.

In the lower face 48 that is a face crossing the rotational axis RX of the flat screw 40, a groove portion 42 in a spiral shape is formed. The communication channel 22 of the material supply section 20 described above communicates with the groove portion 42 from a side face of the flat screw 40. As shown in FIG. 2, in this embodiment, three groove portions 42 are formed separated by a projecting ridge portion 43. The number of groove portions 42 is not limited to 3, and may be 1 or 2 or more. The shape of the groove portion 42 is not limited to a spiral shape, and may be a helical shape or an involute curve shape, or may be a shape extending so as to draw an arc toward the outer circumference from the central portion.

The lower face 48 of the flat screw 40 faces the upper face 52 of the screw opposed section 50, and a space is formed between the groove portion 42 in the lower face 48 of the flat screw 40 and the upper face 52 of the screw opposed section 50. In the shaping section 110, in this space between the flat screw 40 and the screw opposed section 50, the raw material MR is supplied from the material supply section 20 to a material inlet 44 shown in FIG. 2.

In the screw opposed section 50, a heater 58 for heating the raw material MR supplied into the groove portion 42 of the rotating flat screw 40 is embedded. To the screw opposed section 50, a communication hole 56 is coupled, and multiple guide grooves 54 extending in a spiral shape toward the outer circumference from the communication hole 56 are formed. One end of the guide groove 54 need not be coupled to the communication hole 56. The guide groove 54 may also be omitted.

The raw material MR supplied into the groove portion 42 of the flat screw 40 flows along the groove portion 42 by rotation of the flat screw 40 while being melted in the groove portion 42, and is guided to a central portion 46 of the flat screw 40 as the shaping material. The shaping material in a paste form expressing fluidity flowing in the central portion is supplied to the ejection section 60 through the communication hole 56 provided at the center of the screw opposed section 50 shown in FIG. 3. In the shaping material, not all types of materials constituting the shaping material need to be melted. The shaping material need only to be transformed into a state having fluidity as a whole by melting at least some types of materials among the materials constituting the shaping material.

The ejection section 60 includes a nozzle 61 that ejects the shaping material, a flow channel 65 for the shaping material provided between the flat screw 40 and the nozzle 61, and an opening and closing mechanism 70 that opens and closes the flow channel 65. The nozzle 61 is coupled to the communication hole 56 in the screw opposed section 50 through the flow channel 65. The nozzle 61 ejects the shaping material formed in the shaping material forming section 30 to the stage 210 from an ejection port 62 at a tip.

The opening and closing mechanism 70 opens and closes the flow channel 65 so as to control the outflow of the shaping material from the nozzle 61. In the first embodiment, the opening and closing mechanism 70 is constituted by a butterfly valve. The opening and closing mechanism 70 includes a drive shaft 72 that is a shaft member extending in one direction, a valve body 73 that is turned by rotation of the drive shaft 72, and a valve driving section 74 that generates a rotation driving force for the drive shaft 72.

The drive shaft 72 is attached in the middle of the flow channel 65 so as to cross the flowing direction of the shaping material. More specifically, the drive shaft 72 is attached in parallel to the Y direction that is a direction perpendicular to the flowing direction of the shaping material in the flow channel 65. The drive shaft 72 can rotate around the central axis along the Y direction.

The valve body 73 is a member that rotates in the flow channel 65. In the first embodiment, the valve body 73 is formed by processing a part disposed in the flow channel 65 of the drive shaft 72. The shape of the valve body 73 when viewed in a direction perpendicular to a plate face thereof substantially matches with the opening shape of the flow channel 65 at a site at which the valve body 73 is disposed.

The valve driving section 74 rotates the drive shaft 72 under the control of the control unit 101. The valve driving section 74 is constituted by, for example, a stepping motor. By rotation of the drive shaft 72, the valve body 73 is rotated in the flow channel 65.

A state where the plate face of the valve body 73 is made perpendicular to the flowing direction of the shaping material in the flow channel 65 is a state where the flow channel 65 is closed. In this state, the inflow of the shaping material to the nozzle 61 from the flow channel 65 is blocked, and the outflow of the shaping material from the ejection port 62 is stopped. When the plate face of the valve body 73 is rotated from the state of being made perpendicular by rotation of the drive shaft 72, the inflow of the shaping material to the nozzle 61 from the flow channel 65 is permitted, and the shaping material in an ejection amount corresponding to the rotation angle of the valve body 73 flows out from the ejection port 62. As shown in FIG. 1, a state of being along the flowing direction of the shaping material in the flow channel 65 is a state where the flow channel 65 is fully open. In this state, the ejection amount of the shaping material per unit time from the ejection port 62 becomes maximum. In this manner, the opening and closing mechanism 70 can achieve adjustment of the ejection amount of the shaping material as well as on and off of the outflow of the shaping material.

The stage 210 is disposed at a position opposed to the ejection port 62 of the nozzle 61. In the first embodiment, a shaping face 211 of the stage 210 opposed to the ejection port 62 of the nozzle 61 is disposed in parallel to the X and Y directions, that is, the horizontal direction. As described later, the three-dimensional shaping apparatus 100 shapes a three-dimensional shaped article by ejecting the shaping material to the shaping face 211 of the stage 210 from the ejection section 60 and stacking layers.

The moving mechanism 230 changes a relative position of the stage 210 to the nozzle 61. In the first embodiment, the position of the nozzle 61 is fixed, and the moving mechanism 230 moves the stage 210. The moving mechanism 230 is constituted by a three-axis positioner for moving the stage 210 in the three axis directions of the X, Y, and Z directions by the driving forces of three motors M. The moving mechanism 230 changes the relative positional relationship between the nozzle 61 and the stage 210 under the control of the control unit 101. In the specification, unless otherwise stated, the phrase "to move the nozzle 61" means "to relatively move the nozzle 61 with respect to the stage 210".

In other embodiments, a configuration in which the moving mechanism 230 moves the nozzle 61 with respect to the stage 210 in a state where the position of the stage 210 is fixed may be adopted instead of the configuration in which the stage 210 is moved by the moving mechanism 230. In addition, a configuration in which the stage 210 is moved in the Z direction by the moving mechanism 230 and the nozzle 61 is moved in the X and Y directions, or a configuration in which the stage 210 is moved in the X and Y directions by the moving mechanism 230 and the nozzle 61 is moved in the Z direction may be adopted. Even in such a configuration, the relative positional relationship between the nozzle 61 and the stage 210 can be changed.

The control unit 101 is a control device that controls the entire operation of the three-dimensional shaping apparatus 100. The control unit 101 is constituted by a computer including one or multiple processors, a main storage device, and an input/output interface for performing signal input/output to/from the outside. The control unit 101 exhibits various functions other than a function as a data generating section 102 by execution of a program or a command read in the main storage device by the processor. The control unit 101 may be realized by a configuration in which multiple circuits for realizing at least some of the functions are combined instead of being constituted by a computer. The control unit 101 is sometimes referred to as "information processing apparatus".

The data generating section 102 generates shaping data having multiple partial paths for moving the ejection section 60 by the moving mechanism 230. The control unit 101 controls the shaping section 110 including the opening and closing mechanism 70 and the ejection section 60, and the moving mechanism 230 so as to shape a three-dimensional shaped article on the stage 210 according to the shaping data generated by the data generating section 102.

The data generating section 102 generates the shaping data using shape data such as three-dimensional CAD data representing the shape of the three-dimensional shaped article. The shaping data include ejection control data including an ejection path of the shaping material and an ejection amount of the shaping material by the ejection section 60. The ejection path of the shaping material is a path in which the nozzle 61 relatively moves along the shaping face 211 of the stage 210 while ejecting the shaping material.

The ejection path is constituted by multiple partial paths. Each partial path is a linear path. The ejection control data are individually associated with each partial path. In this embodiment, the ejection amount represented by the ejection control data is an amount of the shaping material to be ejected per unit time in the partial path. In other embodiments, the total amount of the shaping material to be ejected in the entire partial path may be associated with each partial path as the ejection control data.

Figure 4:
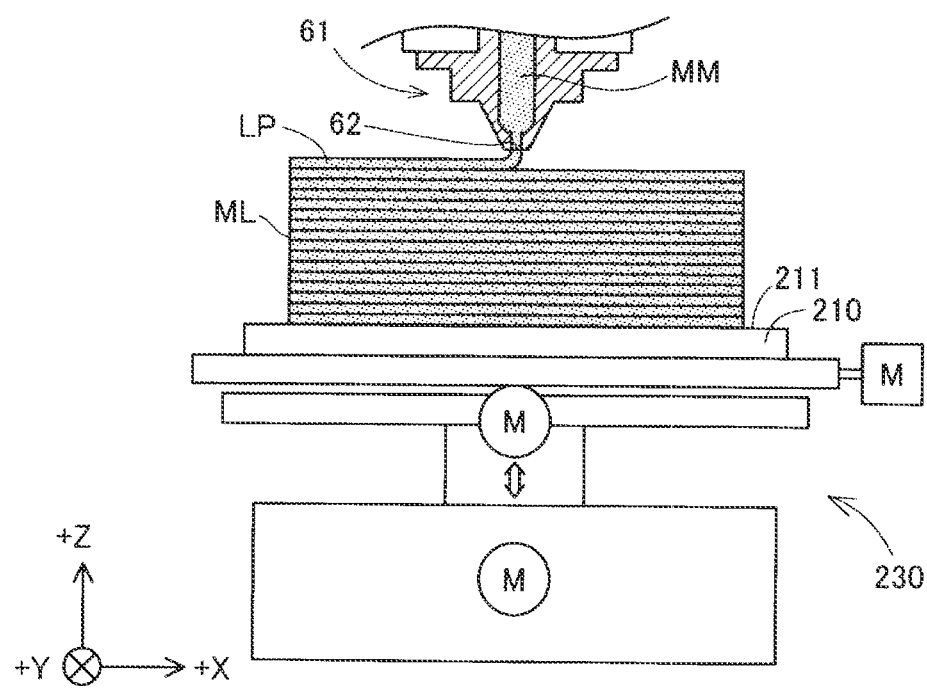
FIG. 4 is an explanatory view schematically showing a manner of shaping a three-dimensional shaped article.

FIG. 4 is an explanatory view schematically showing a manner of shaping the three-dimensional shaped article in the three-dimensional shaping apparatus 100. In the three-dimensional shaping apparatus 100, as described above, in the shaping material forming section 30, a shaping material MM is formed by melting the raw material MR in a solid state supplied to the groove portion 42 of the rotating flat screw 40. The control unit 101 ejects the shaping material MM from the nozzle 61 while maintaining a distance between the shaping face 211 of the stage 210 and the nozzle 61 and changing the position of the nozzle 61 with respect to the stage 210 to a direction along the shaping face 211 of the stage 210. The shaping material MM ejected from the nozzle 61 is continuously deposited in the moving direction of the nozzle 61. By scanning of the nozzle 61 in this manner, a linear portion LP that is a shaped portion linearly extending along a scanning path of the nozzle 61 is shaped.

The control unit 101 forms layers ML by repeating the scanning of the nozzle 61 described above. The control unit 101 moves the position of the nozzle 61 with respect to the stage 210 in the Z direction after forming one layer ML. Then, by further stacking the layer ML on the layer ML formed so far, the three-dimensional shaped article is shaped.

The control unit 101 sometimes temporarily suspends the ejection of the shaping material from the nozzle 61, for example, when the nozzle 61 is moved in the Z direction when the layer ML for one layer is completed, or when there are multiple independent shaping regions in each layer. In this case, the ejection of the shaping material MM from the ejection port 62 is stopped by closing the flow channel 65 by the valve body 73 of the opening and closing mechanism 70. The control unit 101 changes the position of the nozzle 61, and then resumes deposition of the shaping material MM from the position of the nozzle 61 after changing by opening the flow channel 65 by the valve body 73 of the opening and closing mechanism 70. According to the three-dimensional shaping apparatus 100, by the opening and closing mechanism 70, the position of deposition of the shaping material MM by the nozzle 61 can be simply controlled.

Figure 5:
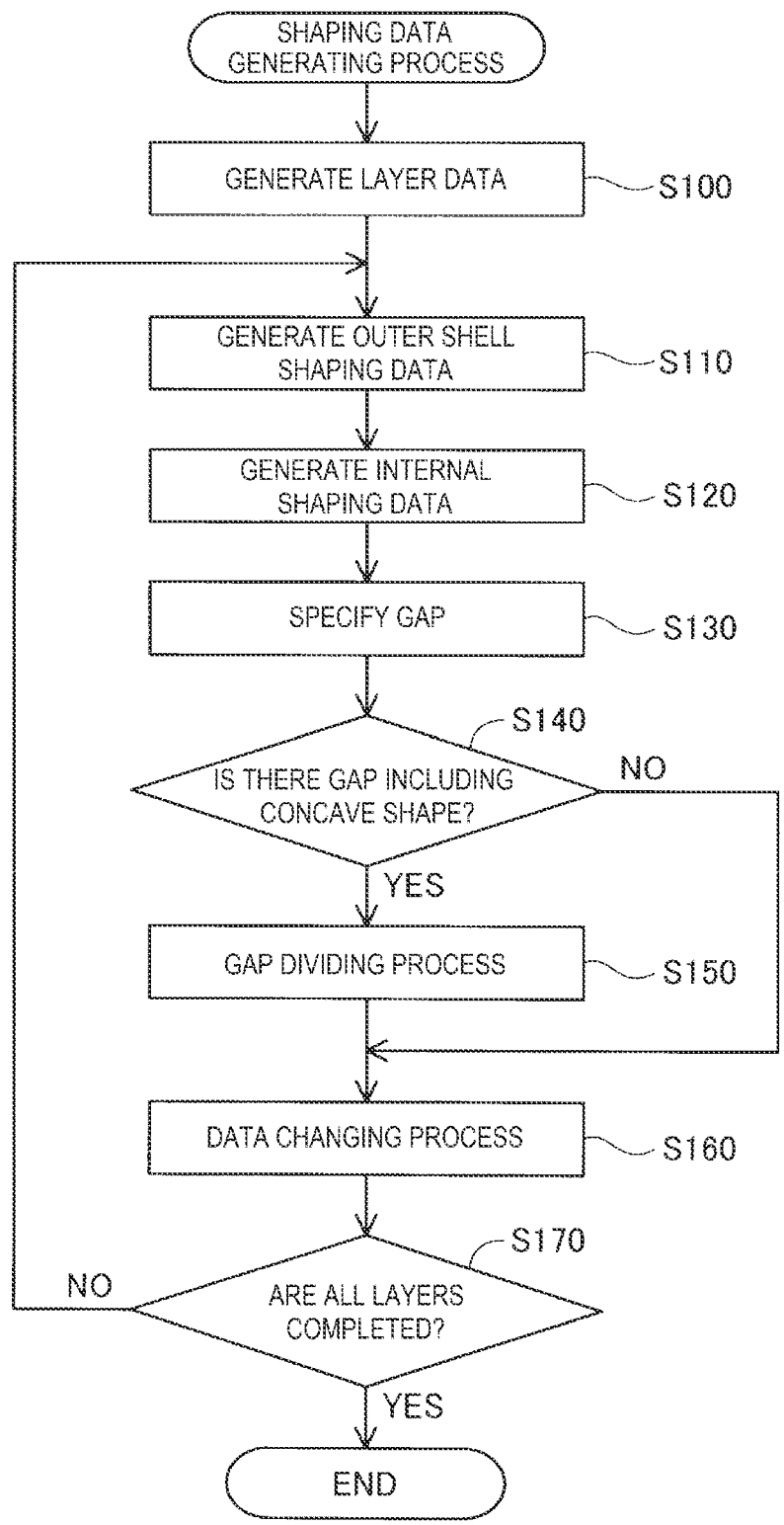
FIG. 5 is a flowchart of a shaping data generating process.
Figure 6:
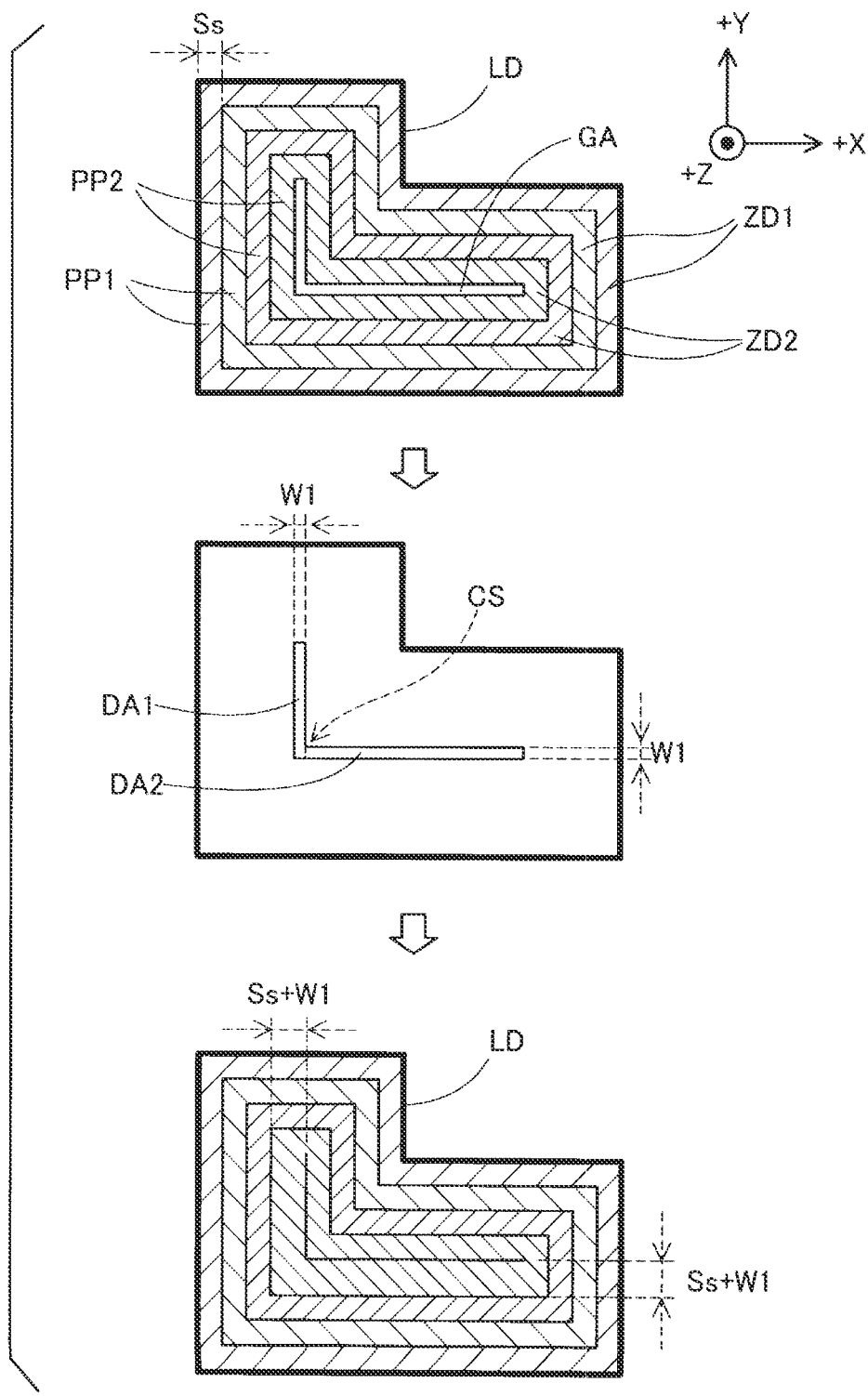
FIG. 6 is an explanatory view of the shaping data generating process.

FIG. 5 is a flowchart of a shaping data generating process to be executed by the control unit 101. FIG. 6 is an explanatory view of the shaping data generating process. The shaping data generating process is a process for generating the shaping data to be used in shaping of the three-dimensional shaped article prior to shaping of the three-dimensional shaped article.

As shown in FIG. 5, in Step S100, the data generating section 102 generates layer data by analyzing three-dimensional CAD data that are the shaping data of the three-dimensional shaped article input from the outside, and slicing the three-dimensional shaped article into multiple layers along the XY plane. The layer data are data representing the outer shell of the three-dimensional shaped article in the XY plane. In the upper part of FIG. 6, a portion corresponding to the outer shell represented by layer data LD is indicated by a thick line.

In Step S110, the data generating section 102 generates outer shell shaping data. The outer shell shaping data are data for forming an outer shell region that is in contact with the inside of the outer shell represented by the layer data LD. The outer shell region is a region that has an effect on the appearance of the three-dimensional shaped article. The outer shell shaping data include a path for shaping the outermost circumference along the outer shell of the three-dimensional shaped article. The outer shell shaping data may also include an ejection path including one round inside the outermost circumference as well as the ejection path for shaping the outermost circumference of the three-dimensional shaped article. The number of rounds of the ejection path for forming the outer shell region may be arbitrarily settable.

In FIG. 6, an example in which outer shell shaping data ZD1 are constituted by the outermost ejection path and the ejection path for one round inside the outermost ejection path is shown. These ejection paths include multiple partial paths PP1 for shaping the outer shell region. As described above, each partial path PP1 is a linear path. With each of the partial paths PP1, the ejection amount such that the shaping material to be deposited at the stage 210 has a predetermined reference width Ss is associated as the ejection control data. In FIG. 6, the outermost ejection path and the ejection path in the inner side of the outermost ejection path become discontinuous paths, but these may be configured as a continuous path.

In Step S120, the data generating section 102 generates internal shaping data. The internal shaping data are data for shaping an internal region that is a region in the inner side of the outer shell represented by the layer data LD and is a region other than the outer shell region in the three-dimensional shaped article. The internal region is a region that has a larger effect on the strength of the three-dimensional shaped article than on the appearance of the three-dimensional shaped article.

In FIG. 6, an example in which internal shaping data ZD2 for two rounds are expressed in the inner side of the outer shell shaping data ZD1 is shown. The ejection path for filling up the internal region represented by the internal shaping data ZD2 includes multiple partial paths PP2. As described above, each partial path PP2 is a linear path. With each of the partial paths PP2, the ejection amount such that the shaping material to be deposited at the stage 210 has a predetermined reference width Ss is associated as the ejection control data. In this embodiment, the width of the path to be shaped in the outer shell shaping data ZD1 and the width of the path to be shaped by the internal shaping data ZD2 are each assumed to be the reference width Ss, however, these may have a different width.

Hereinafter, the outer shell shaping data to be generated in Step S110 and the internal shaping data to be generated in Step S120 are collectively referred to as "first data". The first data have path data representing a path in which the ejection section 60 moves while ejecting the shaping material by multiple partial paths, and have ejection control data including ejection amount information representing the ejection amount of the shaping material in each of the partial paths.

In Step S130, the data generating section 102 specifies a gap region sandwiched by multiple partial paths by analyzing the arrangement and width of each partial path based on the first data. In this embodiment, in Step S130, a gap region including one or multiple concave shapes at the outer circumference is specified. In the middle part of FIG. 6, an L-shaped gap region GA specified from the internal shaping data ZD2 shown in the upper part of FIG. 6 is shown. The gap region GA includes one concave shape CS at the outer circumference. The gap region having a concave shape at the outer circumference has, for example, a polygonal shape having an internal angle larger than 180° and smaller than 360°, that is, a polygonal shape having a concave angle. In the concave shape, a curve shape having an inwardly recessed portion is also included.

When specifying the gap region, the data generating section 102 specifies a gap region that is a gap region sandwiched by multiple partial paths and that satisfies the following relationship (1).

$$W \leq Smax - Ss \quad (1)$$

W is a width of the gap region, Ss is a reference width of the shaping material to be deposited in each partial path, and Smax is a maximum width of the shaping material depositable in each partial path by controlling the opening and closing mechanism 70. The reference width Ss is a line width smaller than the maximum width Smax. The reference width Ss may be arbitrarily set, but can be set to a width that is 60 to 80% of the maximum width Smax. The reference width Ss is preferably a width larger than one half of the maximum width Smax.

According to the above relationship (1), a gap region which can be filled up by expanding the width of the partial path with the reference width Ss adjacent to one side of the gap region within the range up to the maximum width Smax is specified. The gap region GA shown in the middle part of FIG. 6 is a gap region that satisfies the above relationship (1).

In Step S140, the data generating section 102 determines whether or not a gap region including a concave shape is specified in Step S130. When a gap region including a concave shape is specified, the data generating section 102 executes a gap dividing process in Step S150. In the gap dividing process, the data generating section 102 performs a process of dividing the gap region having one or multiple concave shapes at the outer circumference into multiple regions so as to decrease the number of concave shapes included in the gap region. The phrase "so as to decrease the number" includes "to decrease the number to 0". In the middle part of FIG. 6, an example in which the L-shaped gap region GA is divided into two gap regions having a rectangular shape is shown. In this example, the number of concave shapes is decreased from 1 to 0. The gap regions resulting from division are hereinafter referred to as divided gap regions. In the middle part of FIG. 6, two divided gap regions DA1 and DA2 are shown. The divided gap region DA1 is a rectangular region in which the Y direction is a longitudinal direction, and the divided gap region DA2 is a rectangular region in which the X direction is a longitudinal direction.

The data generating section 102 executes a data changing process in Step S160. When the entire gap region satisfies the above relationship (1), each of the divided gap regions also satisfies the above relationship (1). Then, if the above relationship (1) is satisfied, the divided gap region can be filled up by increasing the width of only one partial path out of the partial paths that sandwich the divided gap region. Therefore, in this embodiment, in the data changing process in Step S160, the data generating section 102 generates second data from the first data by changing the ejection control data corresponding to the partial path so as to increase the line width of the shaping material to be deposited above the stage 210, that is, on the stage 210 or the previously formed layer in either one partial path out of the partial paths that are in contact with the divided gap region so as to sandwich the divided gap region. In this embodiment, the data generating section 102 increases the ejection amount represented by the ejection control data associated with the partial path, thereby increasing the width of the shaping material to be deposited in the partial path. In the example shown in the lower part of FIG. 6, the data generating section 102 increases the ejection amount so as to increase each of the width of the partial path adjacent in the −X direction side for the divided gap region DA1 and the width of the partial path adjacent in the −Y direction side for the divided gap region DA2 from the reference width Ss to a width obtained by adding a width W1 of the divided gap region to the reference width Ss.

The data generating section 102 may change the path of the partial path according to the shape of the divided gap region as well as increasing the width of the shaping material in the partial path. Specifically, the data generating section 102 changes the position of the path so that the path of the linear partial path passes through the center of the shaping material after changing the line width. By changing not only the width of the partial path, but also the path itself in this manner, a gap portion can be accurately filled up.

Figure 7:
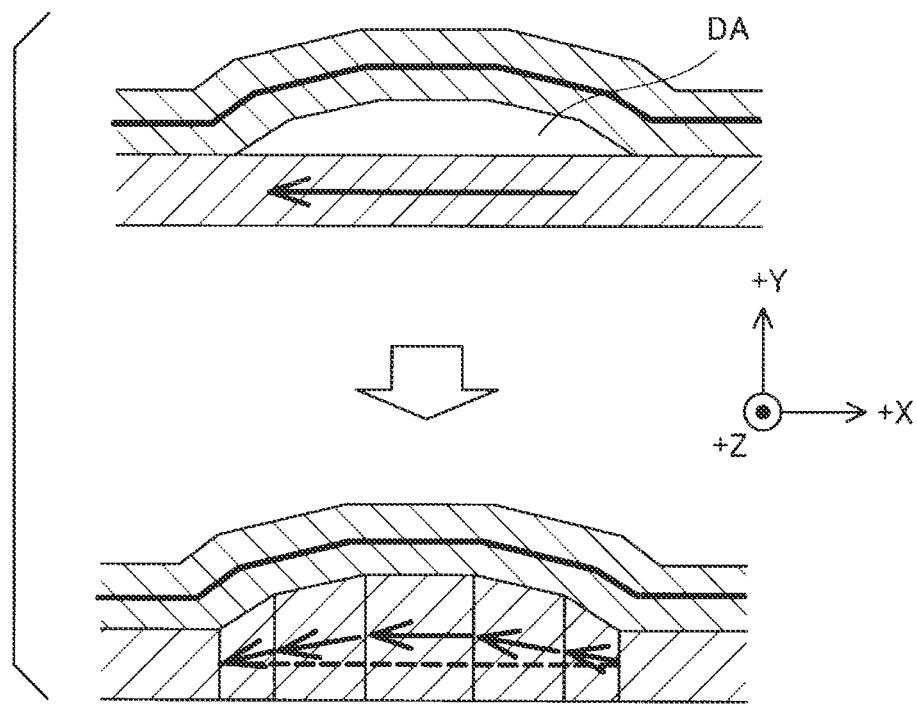
FIG. 7 is a view schematically showing a divided gap region whose width changes.

FIG. 7 is a view schematically showing a divided gap region DA whose width changes. In FIG. 6, an example in which the shape of the divided gap region is a rectangle having a constant width is shown, however, the shape of the divided gap region is not limited to a rectangle. For example, as shown in the upper part of FIG. 7, there can also be a case where the shape of the divided gap region is such that the width thereof changes like a fan shape. When the width of the divided gap region changes in this manner, the data generating section 102 may generate the second data by adjusting the line width of the shaping material to be deposited in the adjacent partial path according to the change in the width of the divided gap region. Specifically, as shown in the lower part of FIG. 7, the partial path adjacent to the divided gap region is divided into multiple partial paths, and the line width of each of the partial paths resulting from division is increased so as to change according to the change in the width of the divided gap region. By changing the partial path in this manner, the divided gap region can be efficiently filled up, and the shaping accuracy can be enhanced. In addition, in this embodiment, as shown in the lower part of FIG. 7, the data generating section 102 may change the path of each of the partial paths after division to a path according to the shape of the divided gap region. In the lower part of FIG. 7, each of the partial paths resulting from division is changed to a path along the arc shape of the divided gap region from the linear path indicated by a broken line. The changing of the partial path is achieved by, for example, changing it to a path that passes through the center of an enlarged width. By changing the partial path to a path having a shape corresponding to the shape of the divided gap region in this manner, a gap portion can be efficiently filled up, and the shaping accuracy can be enhanced.

When a gap region including a concave shape is not specified in the above Step S130, the data generating section 102 skips the gap dividing process in Step S150. When a gap region not including a concave shape is specified in Step S130, the data generating section 102 generates the second data from the first data by changing the ejection control data corresponding to the partial path so as to increase the line width of the shaping material to be deposited above the stage 210, that is, on the stage 210 or the previously formed layer in either one partial path out of the partial paths that are in contact with the gap region so as to sandwich the gap region in Step S160. That is, in the gap region not including a concave shape, the gap is filled up by the same method as the method for filling up the divided gap region. When the data changing process is executed in Step S160, the second data are generated by changing the first data. When neither of a gap region including a concave shape nor a gap region not including a concave shape is specified in the above Step S130, in the data changing process in Step S160, the data generating section 102 uses the first data as the second data as they are. The second data are shaping data to be finally generated by the shaping data generating process.

In Step S170 in FIG. 5, the data generating section 102 determines whether or not the above process is completed for all layer data. When the process is not completed for all layer data, the data generating section 102 repeats the process from Step S110 to Step S160 for the subsequent layer data. When generation of the shaping data is completed for all layer data, the data generating section 102 ends the shaping data generating process. Note that Step S150 in the shaping data generating process described above is also referred to as "first step" in the three-dimensional shaped article production method, and Step S160 is also referred to as "second step" in the method.

Figure 8:
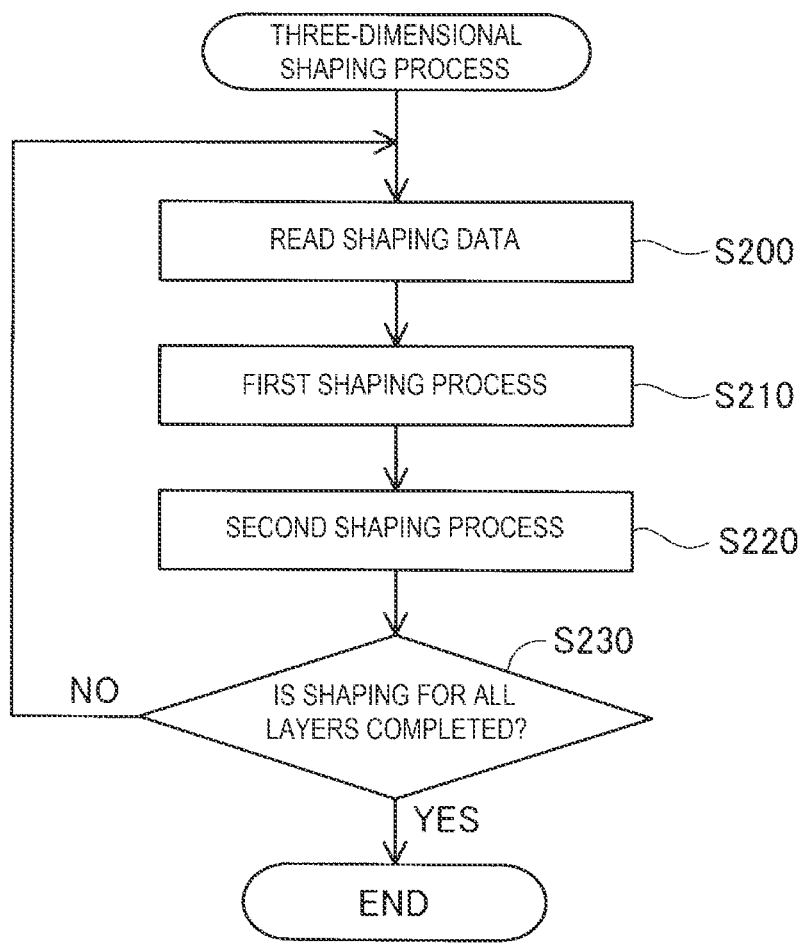
FIG. 8 is a flowchart of a three-dimensional shaping process to be executed by a control unit.

FIG. 8 is a flowchart of a three-dimensional shaping process to be executed by the control unit 101. The three-dimensional shaping process is a process to be executed by the control unit 101 using the shaping data generated in the shaping data generating process shown in FIG. 5. By executing the shaping data generating process shown in FIG. 5 and the three-dimensional shaping process shown in FIG. 8, the three-dimensional shaped article production method using the three-dimensional shaping apparatus 100 is realized.

In Step S200, the control unit 101 reads the shaping data for one layer among the multiple layers constituting the three-dimensional shaped article. In the shaping data, the above-mentioned outer shell shaping data and internal shaping data are included. In this embodiment, the control unit 101 first reads the shaping data for a layer located at the lowermost side in the gravity direction among the multiple layers constituting the three-dimensional shaped article.

In Step S210, the control unit 101 executes a first shaping process. In the first shaping process, the control unit 101 controls the moving mechanism 230 and the ejection section 60 so as to form the outer shell region for the current layer according to the partial paths included in the outer shell shaping data and the ejection control data associated with each of the partial paths.

In Step S220, the control unit 101 executes a second shaping process. In the second shaping process, the control unit 101 controls the moving mechanism 230 and the ejection section 60 so as to form the internal region for the current layer according to the partial paths included in the internal shaping data and the ejection control data associated with each of the partial paths. In the example of the layer data shown in FIG. 6, in the second shaping process, the width of the shaping material in a portion corresponding to the partial path adjacent to the gap region GA is expanded from the reference width Ss to a width obtained by adding the width W1 of the gap region to the reference width Ss.

In Step S230, the control unit 101 determines whether or not shaping is completed for all layers. When shaping is not completed for all layers, the control unit 101 returns the process to Step S200, and reads the shaping data for the next layer, that is, the layer adjacent to the current layer at the upper side in the gravity direction, and executes the process in Step S210 and Step S220. In this case, in Step S210, prior to ejection of the shaping material from the ejection section 60, the control unit 101 controls the moving mechanism 230 so as to raise the position of the nozzle 61 by a distance corresponding to one layer from the stage 210. When shaping for all layers is completed, the control unit 101 completes the three-dimensional shaping process. Note that Step S210 and Step S220 in the above-mentioned three-dimensional shaping process are also referred to as "third step" in the three-dimensional shaped article production method.

Figure 9:
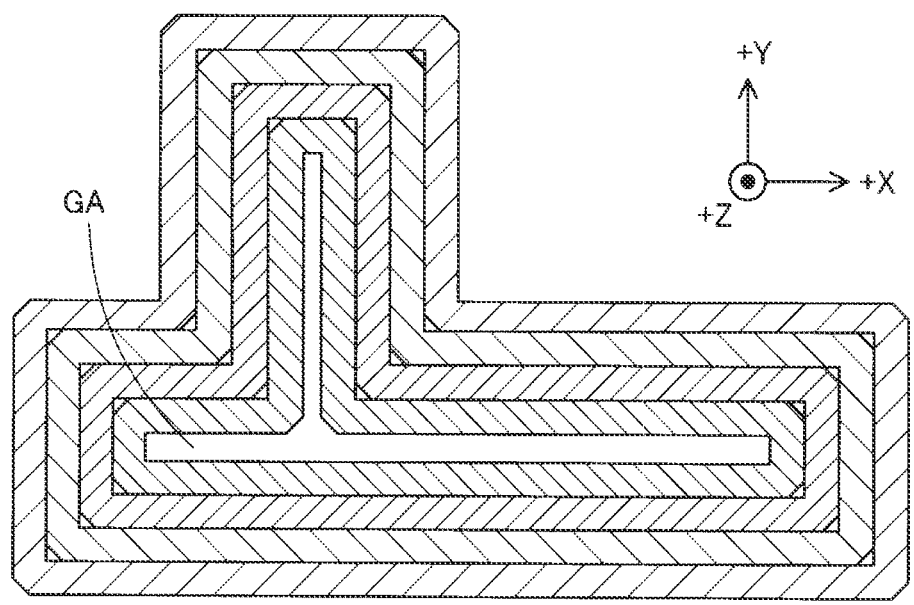
FIG. 9 is an explanatory view showing a specific example of a manner of filling up a gap region.
Figure 10:
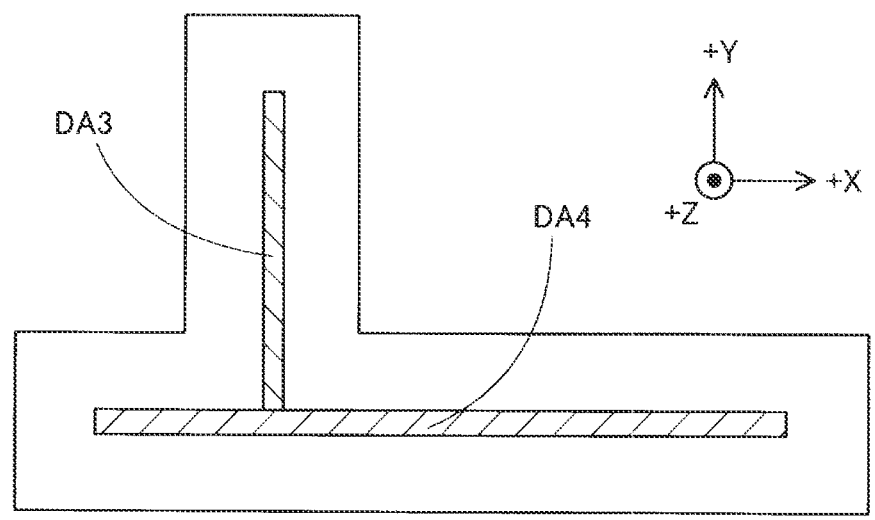
FIG. 10 is an explanatory view showing a specific example of the manner of filling up a gap region.
Figure 11:
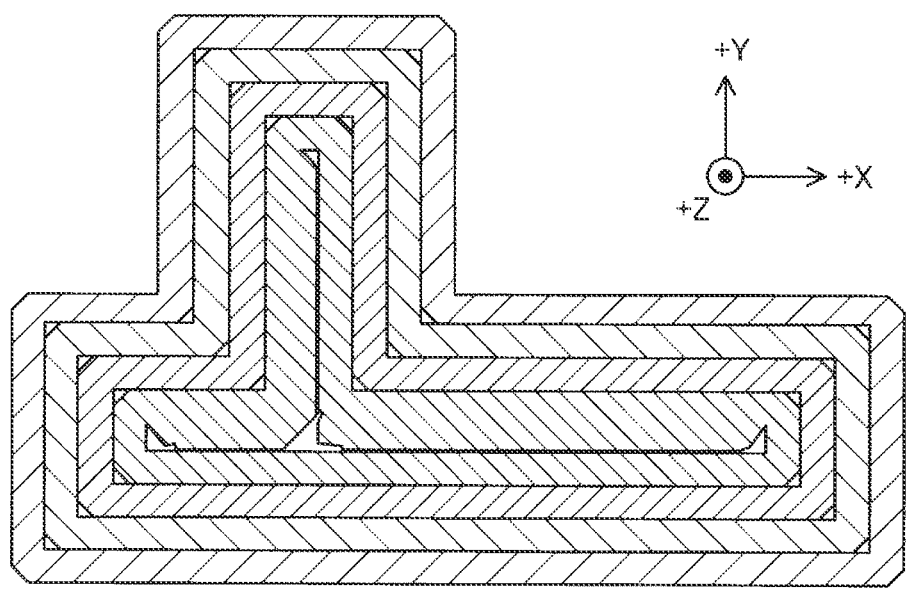
FIG. 11 is an explanatory view showing a specific example of the manner of filling up a gap region.

FIGS. 9 to 11 are explanatory views showing a specific example of a manner of filling up a gap region in the first embodiment. In the example shown in FIG. 9, a T-shaped gap region GA occurs in the internal region. In this case, the data generating section 102 divides the gap region into two divided gap regions DA3 and DA4 in a rectangular shape as shown in FIG. 10 by performing the gap dividing process. Then, as shown in FIG. 11, with respect to the divided gap region DA3, the line width of one of the partial paths adjacent in a direction perpendicular to the longitudinal direction thereof, specifically, the partial path adjacent in the −X direction side in FIG. 11 is increased. Further, also with respect to the divided gap region DA4, the line width of one of the partial paths adjacent in a direction perpendicular to the longitudinal direction thereof, specifically, the partial path adjacent in the +Y direction side in FIG. 11 is increased. By doing this, the data generating section 102 can appropriately fill up the gap region.

Figure 12:
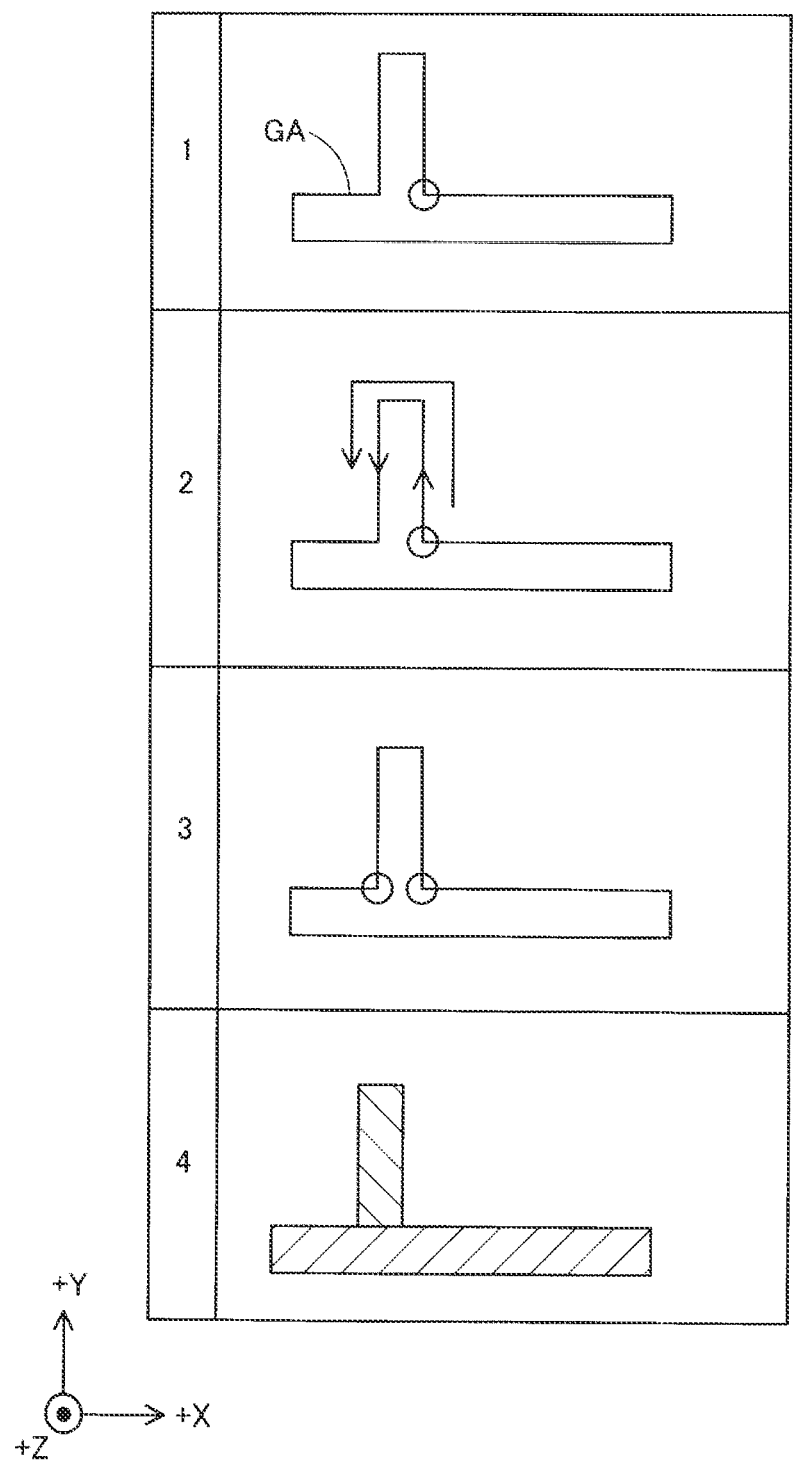
FIG. 12 is an explanatory view showing specific process contents of a gap dividing process.

FIG. 12 is an explanatory view showing specific process contents of the gap dividing process. In FIG. 12, a position determined or specified in each procedure described below is indicated by a circle mark. The data generating section 102 first searches for a vertex that is a vertex on the circumference of the gap region GA and forms a concave angle and specifies it as the origin of division in a first procedure.

In a second procedure, the data generating section 102 sequentially advances from the origin of division through the vertex on the circumference of the gap region GA, searches for a vertex at which the direction of a line segment is reversed, and determines the searched vertex as a candidate for an end point of division. The "vertex at which the direction of a line segment is reversed" refers to a start point or an end point of a vector in which the sign of an X component or a Y component is reversed with respect to a vector with the origin of division as the start point when each side of the gap region is regarded as a vector.

In a third procedure, the data generating section 102 selects a candidate for the endpoint of division at which a distance from the origin of division is shortest among the candidates for the end point of division, and determines the candidate as the end point of division.

In a fourth procedure, the data generating section 102 divides the gap region with a line segment coupling the origin of division and the end point of division, and specifies the divided gap regions.

The data generating section 102 repeatedly executes the above-mentioned procedures 1 to 4 until a divided gap region having a concave angle no longer exists. Provided that even in a case of a divided gap region having a concave angle, its area is equal to or less than a predetermined area, division need not be performed any longer. The predetermined area is, for example, an area corresponding to the opening area of the nozzle 61.

Figure 13:
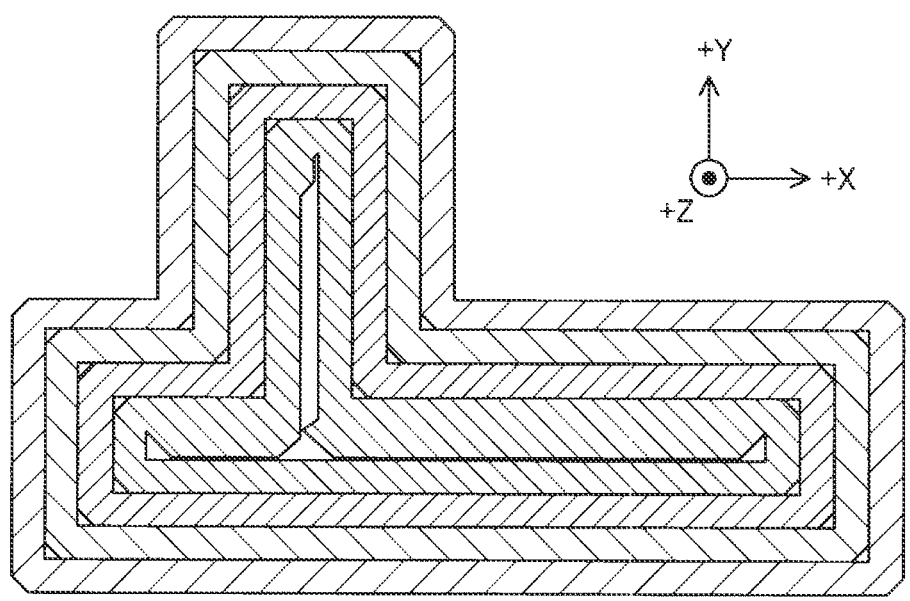
FIG. 13 is a view showing Comparative Example of a result of filling up a gap region.

FIG. 13 is a view showing Comparative Example of a result of filling up the gap region. In this Comparative Example, apart of a gap corresponding to the divided gap region DA3 shown in FIG. 10 is filled up by increasing the line width of the short partial path adjacent in the +Y direction of the gap. In this manner, even in a case of a partial path adjacent to the divided gap region, when the length of the partial path is short, even if the line width of the partial path is increased, a central portion of the gap region having a longitudinal direction may not be appropriately filled up as shown in FIG. 13. On the other hand, when the gap region is divided into multiple divided gap regions according to the procedures described with reference to FIG. 12, the gap region can be divided into multiple rectangles. According to this, the longitudinal direction of each divided gap region can be specified, and therefore, the partial path whose line width is to be increased can be determined to be a partial path adjacent in a direction perpendicular to the longitudinal direction. Accordingly, the divided gap region can be appropriately filled up without increasing the line width of a short partial path. When the formed divided gap region resulting from the gap dividing process is a square, the line width of a partial path that is in contact in any direction may be increased as long as it is a partial path in contact with the divided gap region.

According to the first embodiment described above, the gap region included in each layer is divided, and each of the divided gap regions is filled up with the shaping material, and therefore, even when the shape of the gap region is complicated, the gap region can be appropriately filled up, and the possibility that a void portion remains can be reduced.

Further, in this embodiment, the gap region is divided so as to decrease the number of concave shapes included in the outer circumference of the gap region, and therefore, the shape of each of the divided gap regions can be approximated to a simple shape. Accordingly, the divided gap region can be easily filled up with the shaping material, and a void portion can be effectively prevented from remaining in the gap region.

Further, in this embodiment, the second data are generated by changing the ejection control data so as to increase the line width of the shaping material to be deposited above the stage 210 in the partial path adjacent to the divided gap region. Therefore, the gap can be filled up by increasing the line width of the existing partial path without adding a new partial path, and thus, an increase in the shaping data can be suppressed. In addition, it is not necessary to add a fine partial path that is difficult to shape, and therefore, a gap portion can be easily filled up.

B. Second Embodiment

Figure 14:
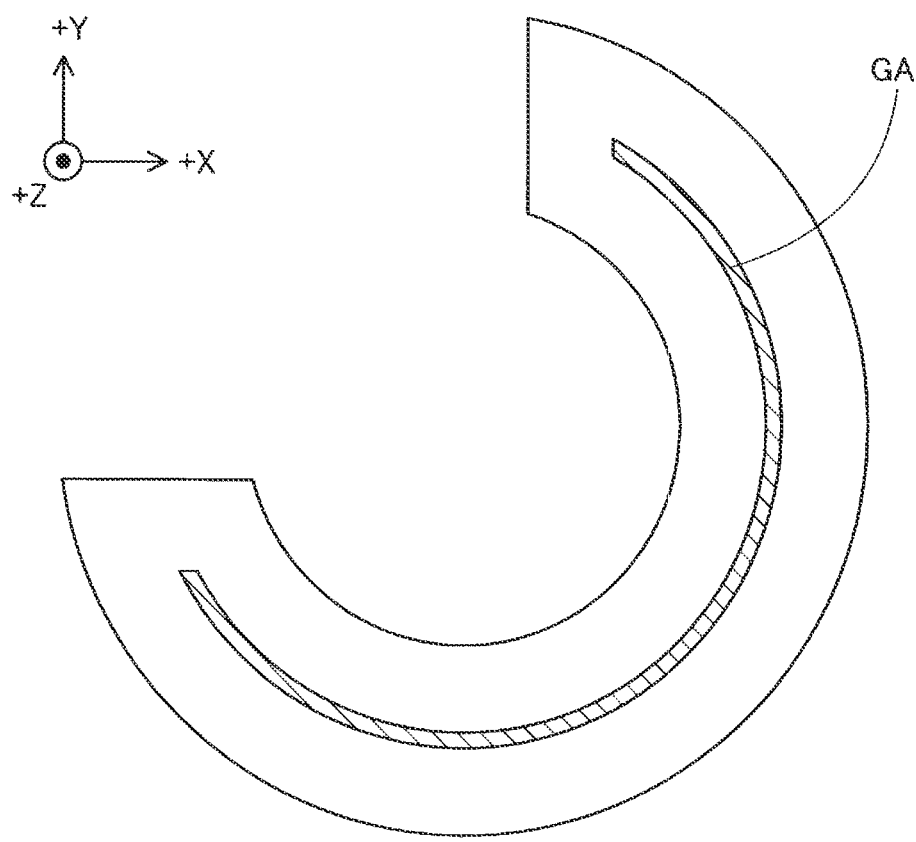
FIG. 14 is an explanatory view showing a manner of filling up a gap region in a second embodiment.
Figure 15:
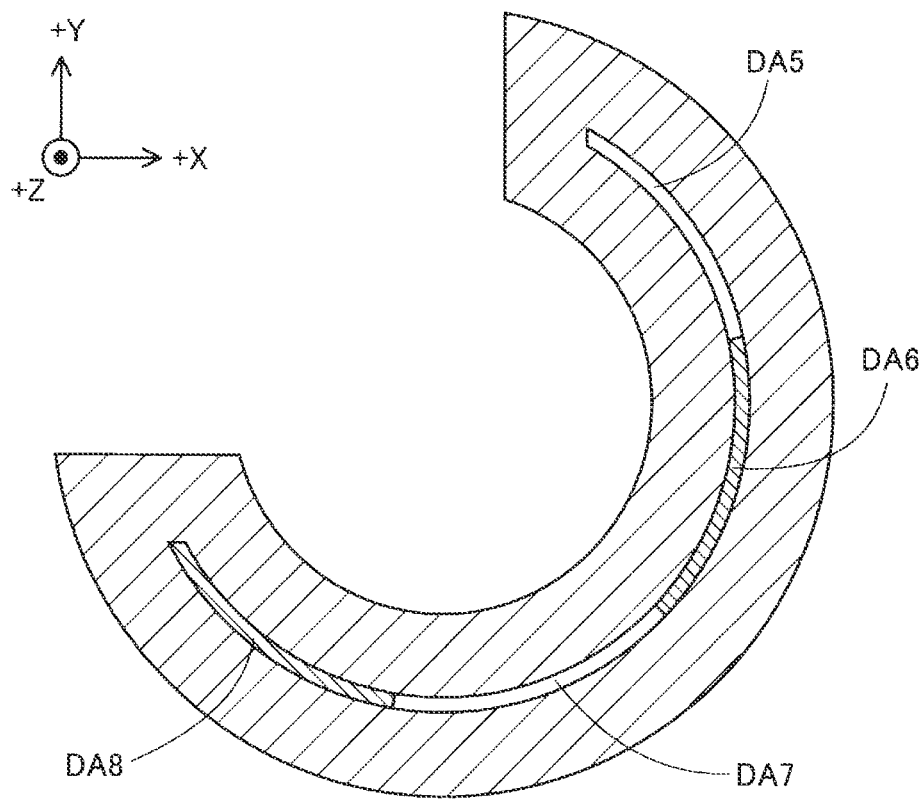
FIG. 15 is an explanatory view showing the manner of filling up a gap region in the second embodiment.
Figure 16:
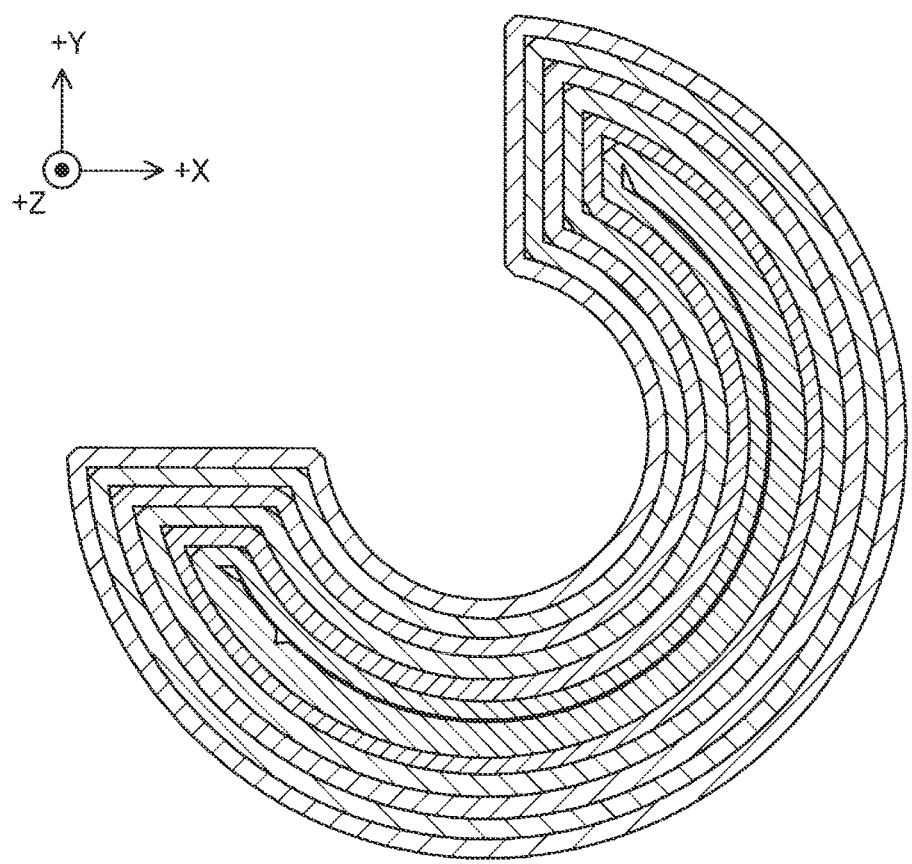
FIG. 16 is an explanatory view showing the manner of filling up a gap region in the second embodiment.

FIGS. 14 to 16 are explanatory views showing a manner of filling up a gap region in a second embodiment. The configuration of the three-dimensional shaping apparatus 100 in the second embodiment is the same as that of the first embodiment, and therefore, the description thereof will be omitted. In the example shown in FIG. 14, an arc-shaped gap region GA occurs in the internal region. In this case, the data generating section 102 divides the arc-shaped gap region into multiple arc-shaped divided gap regions DA5 to DA8 as shown in FIG. 15 by performing the gap dividing process. Then, as shown in FIG. 16, the data generating section 102 increases the line width of a partial path adjacent to each of the divided gap regions DA5 to DA8, more specifically, a partial path whose path length is longer out of two partial paths adjacent to the divided gap region so as to sandwich the divided gap region. By doing this, the data generating section 102 can appropriately fill up the gap region. Note that an arc or a curve shown in these drawings is constituted by continuously coupling multiple small linear partial paths.

Figure 17:
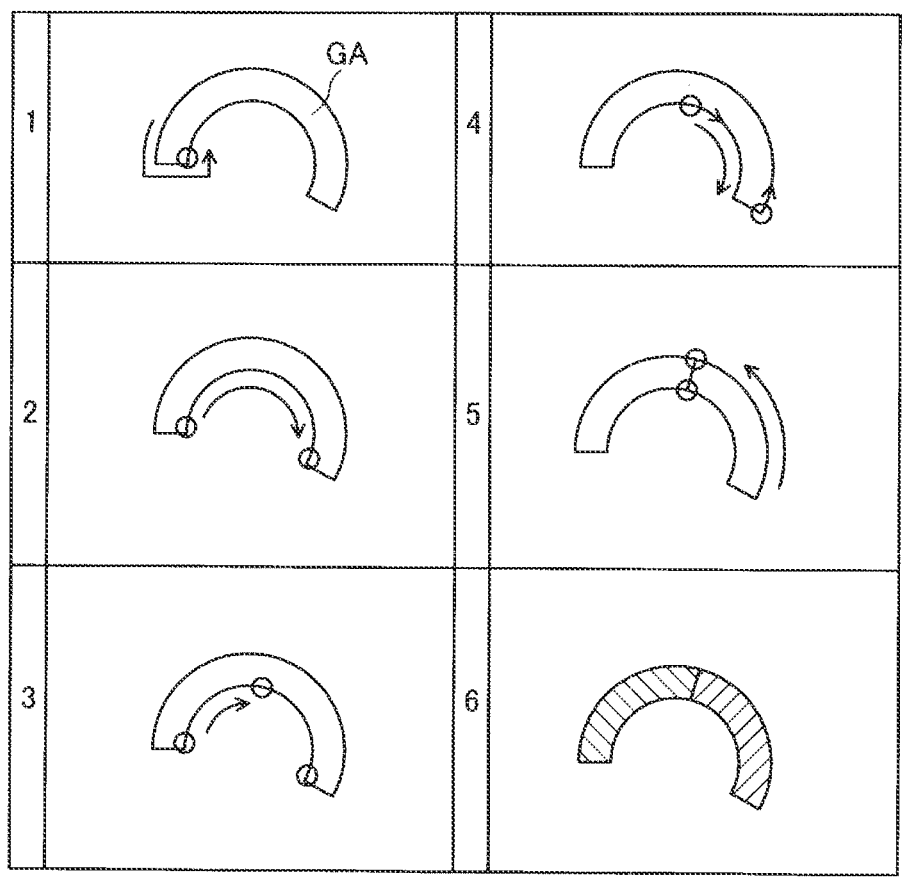
FIG. 17 is an explanatory view showing process contents of a gap dividing process in the second embodiment.

FIG. 17 is an explanatory view showing process contents of the gap dividing process in the second embodiment. In FIG. 17, a position determined or specified in each procedure described below is indicated by a circle mark. The data generating section 102 first searches for and specifies the origin of a curved concave shape in the outer circumference of the gap region in a first procedure.

In a second procedure, the data generating section 102 advances from the origin of the concave shape through a vertex, searches for a vertex to be convex outward, and specifies the vertex to be convex as the end point of the concave shape.

In a third procedure, the data generating section 102 determines an angle difference between an angle from a reference line of a tangent to the concave shape at the origin of the concave shape and an angle from the reference line of the tangent to the concave shape at the end point of the concave shape, searches for a point which is a point on the concave shape, and at which the angle from the reference line of the tangent at the point becomes ½ of the angle difference, and determines the point as the origin of division. In other words, a point on the concave shape at which the angle becomes a value obtained by adding the angle from the reference line of the tangent to the concave shape at the origin of the concave shape and the angle from the reference line of the tangent to the concave shape at the end point of the concave shape, and dividing the resulting value by 2 is searched for, and the point is determined as the origin of division. In this embodiment, the reference line is assumed to be the X axis. When the origin of division is determined based on the angle difference between the origin and the end point of the concave shape in this manner, an appropriate origin of division can be set according to the curved position as compared to a case where the origin of division is set based on a central point of the length of the concave shape.

Subsequently, in a fourth procedure, the data generating section 102 sequentially advances from the origin of division through a vertex on the circumference of the gap region, searches for a vertex at which the direction of a line segment is reversed, and determines the searched vertex as a candidate for an end point of division. The "vertex at which the direction of a line segment is reversed" refers to a vertex corresponding to a start point or an end point of a vector in which the sign of an X component or a Y component is reversed with respect to a tangent vector with the origin of division as the start point when a side included in the gap region is regarded as a vector.

In a fifth procedure, the data generating section 102 further advances along the outer circumference of the gap region from the candidate for the end point of division, searches for a position at which a distance from the origin of division is shortest, and determines the position as the end point of division.

In a sixth procedure, the data generating section 102 divides the gap region with a line segment coupling the origin of division and the endpoint of division, and specifies the divided gap regions.

The data generating section 102 repeatedly executes the above-mentioned procedures 1 to 6 for each divided gap region until the above-mentioned angle difference in each divided gap region becomes a predetermined value or less. The predetermined value is, for example, 60°. In this manner, the arc-shaped gap region is divided into multiple divided gap regions having a simple shape close to a rectangle. However, even if the angle difference exceeds 60°, when the area of the divided gap region is equal to or less than a predetermined area, division need not be performed any longer. The predetermined area is, for example, an area corresponding to the opening area of the nozzle 61.

In the second embodiment described above, the origin of division is determined based on the angle difference between the origin and the end point of the concave shape instead of the center of the length of the concave shape. Therefore, even in a shape which is bent at a position close to the origin or the end point of the concave shape, the origin of division can be appropriately set.

Note that a straight line is a concept included in a curved line. Therefore, also an L-shaped gap region shown in FIG. 6 or a T-shaped gap region shown in FIGS. 9 to 11 can be divided according to the procedures described in the second embodiment.

C. Third Embodiment

Figure 18:
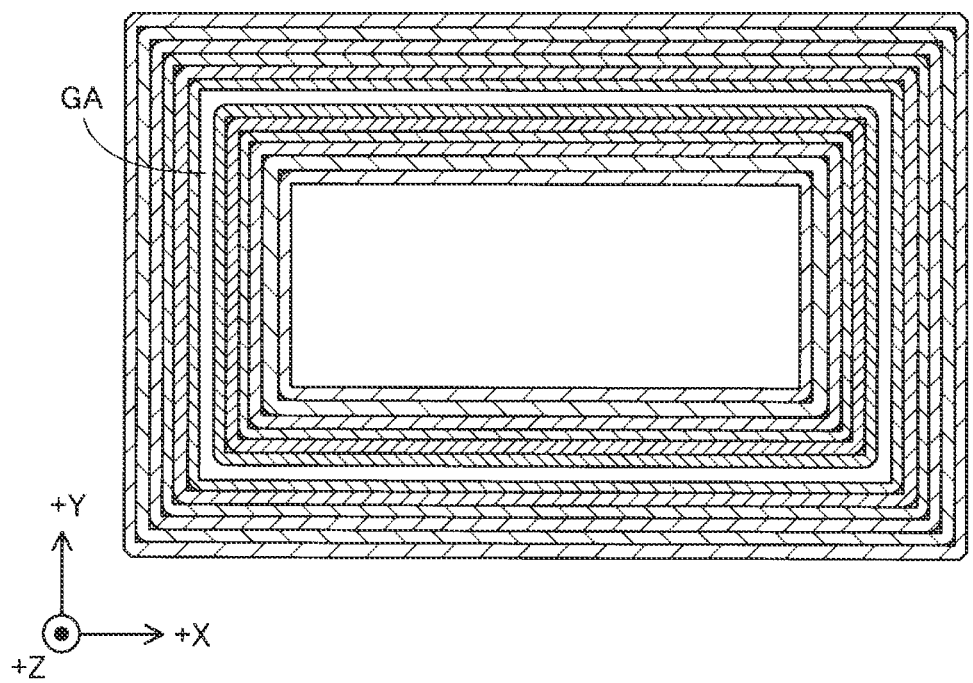
FIG. 18 is an explanatory view showing a manner of filling up a gap region in a third embodiment.
Figure 19:
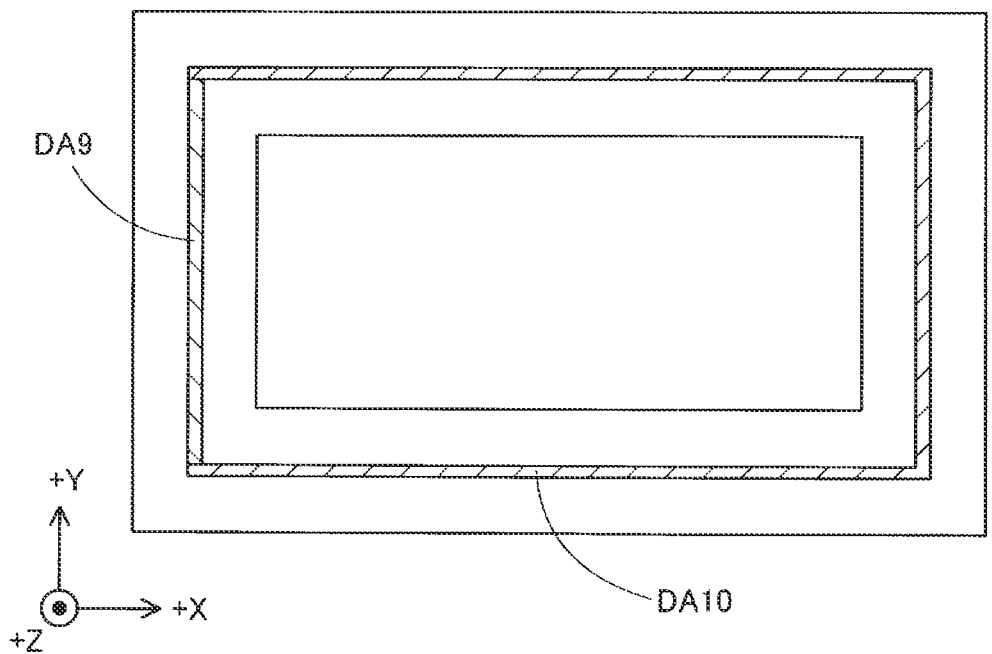
FIG. 19 is an explanatory view showing the manner of filling up a gap region in the third embodiment.
Figure 20:
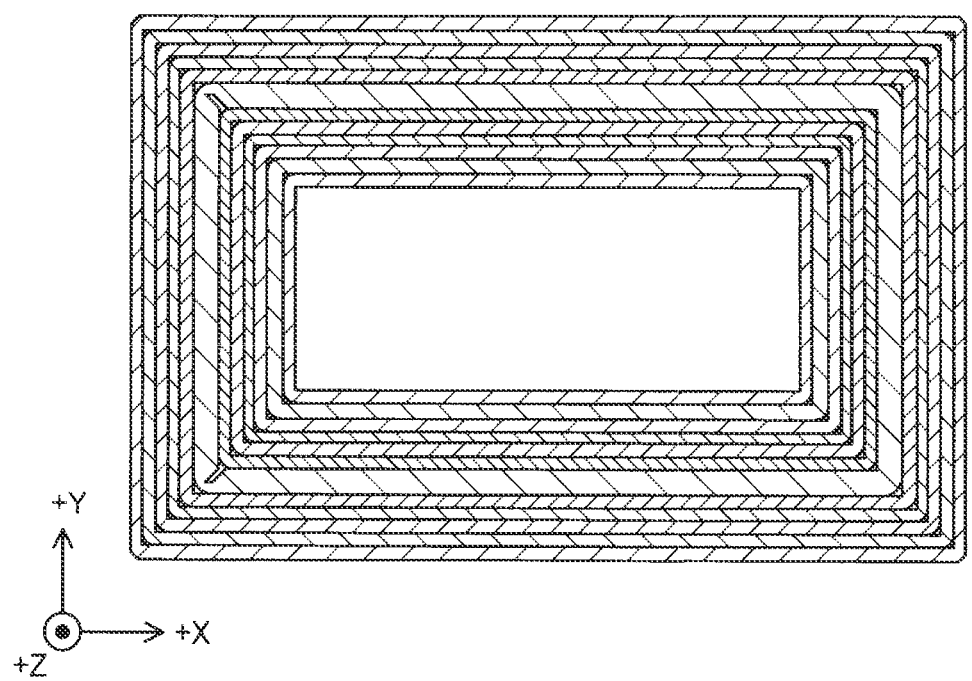
FIG. 20 is an explanatory view showing the manner of filling up a gap region in the third embodiment.

FIGS. 18 to 20 are explanatory views showing a manner of filling up a gap region in a third embodiment. The configuration of the three-dimensional shaping apparatus 100 in the third embodiment is the same as that of the first embodiment, and therefore, the description thereof will be omitted. In the example shown in FIG. 18, a frame-shaped gap region GA occurs in the internal region. The frame-shaped gap region is an annular region having a hole inside. In this case, the data generating section 102 divides the frame-shaped gap region into multiple divided gap regions DA9 to DA10 as shown in FIG. 19 by performing the gap dividing process. Finally, the data generating section 102 increases the line width of a partial path adjacent to each of the divided gap regions, more specifically, a partial path whose path length is longer out of two partial paths adjacent to the divided gap region so as to sandwich the divided gap region as shown in FIG. 20. By doing this, the data generating section 102 can appropriately fill up the gap region.

Figure 21:
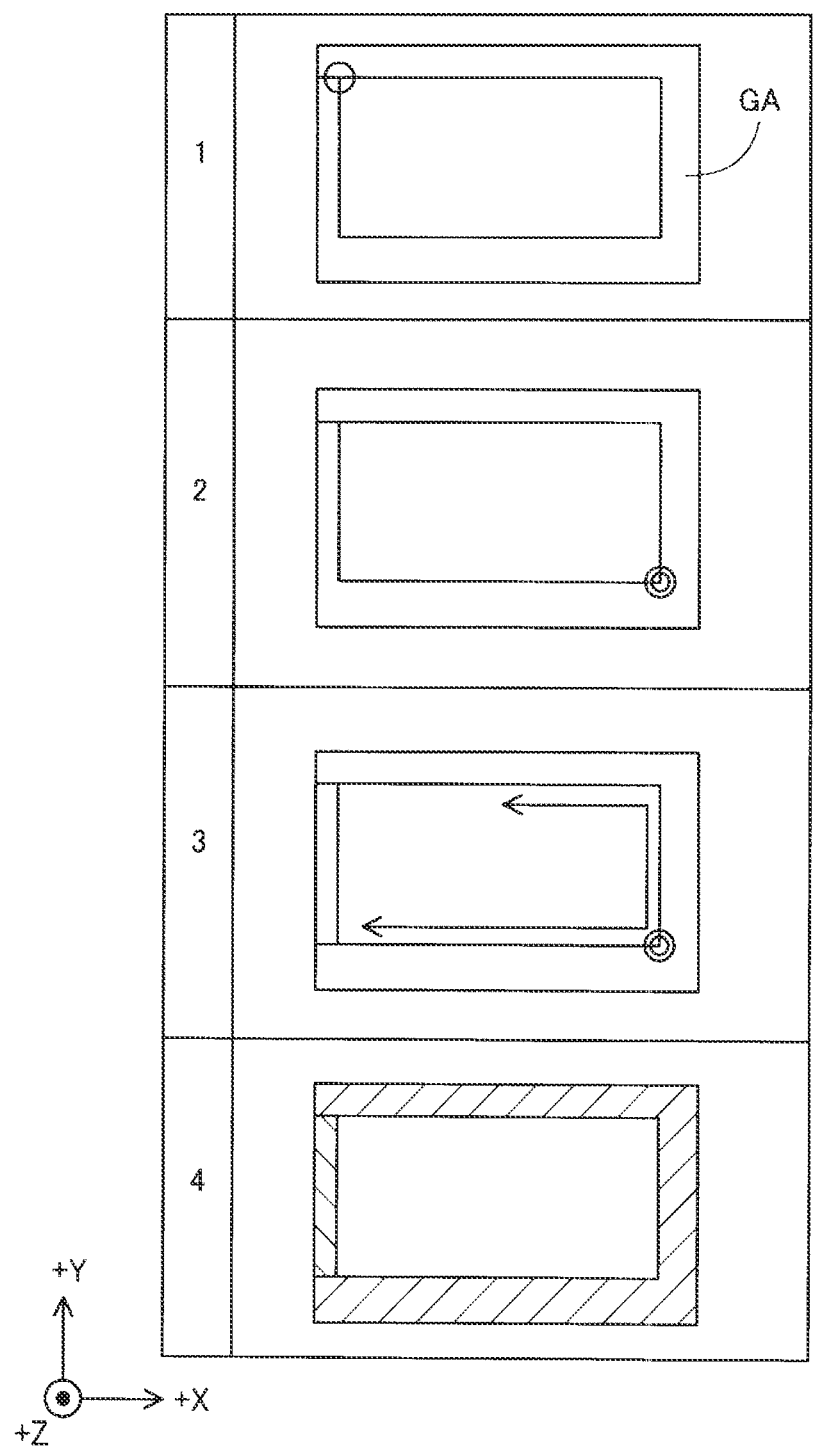
FIG. 21 is an explanatory view showing process contents of a gap dividing process in the third embodiment.

FIG. 21 is an explanatory view showing process contents of the gap dividing process in the third embodiment. The data generating section 102 first specifies the position of a vertex of an arbitrary corner located on the inner circumference of the frame-shaped gap region as indicated by a circle mark in FIG. 21 in a first procedure. Then, the data generating section 102 specifies the position on the outer circumference of the gap region at which a distance from the vertex is shortest, and specifies a line segment coupling the specified positions as the origin of division.

In a second procedure, the data generating section 102 searches for a vertex farthest from the origin of division among the vertices located on the inner circumference of the frame-shaped gap region as indicated by a double circle in FIG. 21, and specifies the vertex as a candidate for the end point of division.

In a third procedure, the data generating section 102 searches for a position at which a distance from the outer circumference is shortest at a position moved in both directions along the inner circumference of the gap region from the candidate for the end point of division, and specifies a line segment coupling the position to the outer circumference at the shortest distance as the end point of division.

In a fourth procedure, the data generating section 102 divides the frame-shaped gap region into two divided gap regions at the origin of division and the end point of division. In this manner, the frame-shaped gap region can be divided into two different divided gap regions.

In the fourth procedure, after forming the divided gap regions, the data generating section 102 divides each of the divided gap regions into smaller divided gap regions by executing the procedures described with reference to FIG. 12 in the first embodiment for each of the divided gap regions. In this manner, each of the divided gap regions can be filled up by the same process as in the first embodiment.

Figure 22:
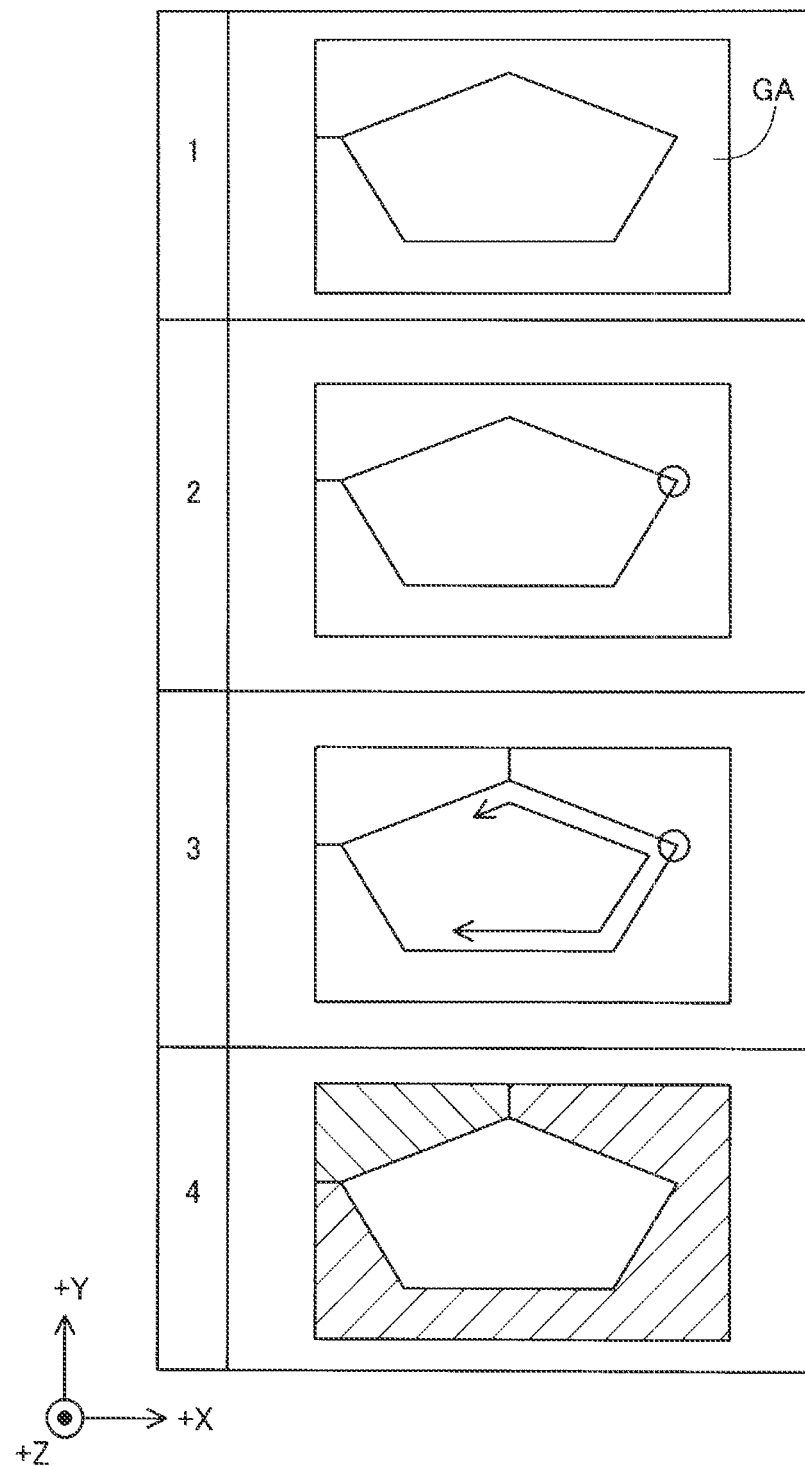
FIG. 22 is a second explanatory view showing process contents of a gap dividing process in the third embodiment.

FIG. 22 is a second explanatory view showing process contents of the gap dividing process in the third embodiment. In FIG. 22, as the gap region, a frame-shaped gap region in which the inner circumference has a pentagonal shape is shown. Even if the inner circumference does not have a rectangular shape in this manner, the gap region can be divided into multiple divided gap regions by executing the same procedures as the procedures 1 to 4 described with reference to FIG. 21. However, in the example shown in FIG. 22, the shape of the outer circumference of each of the divided gap regions formed finally is a polygon that is not a rectangle. In this case, the data generating section 102 determines a rectangular shape having the smallest area circumscribing the divided gap region by calculation, and determines the longitudinal direction of the rectangular shape as the longitudinal direction of the divided gap region, and specifies a partial path whose line width is to be increased using the longitudinal direction. Such a method for determining the longitudinal direction can be applied also in the first and second embodiments similarly.

D. Fourth Embodiment

Figure 23:
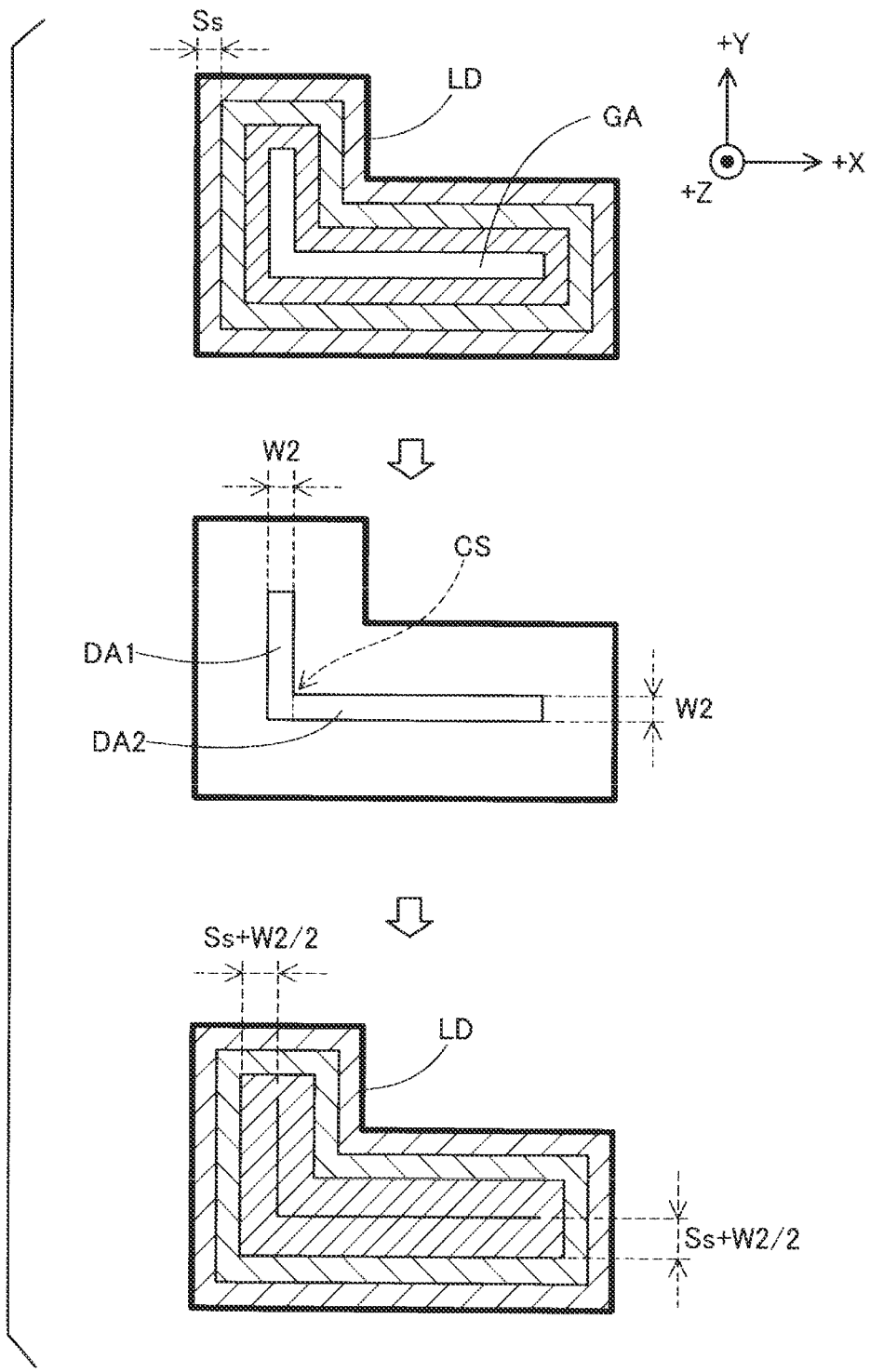
FIG. 23 is an explanatory view of a shaping data generating process in a fourth embodiment.

FIG. 23 is an explanatory view of a shaping data generating process in a fourth embodiment. In the first embodiment, the divided gap region is filled up by increasing the line width of one of the partial paths adjacent to the divided gap region. On the other hand, in the fourth embodiment, the divided gap region is filled up by increasing the line width of both partial paths adjacent to the divided gap region. In the upper part of FIG. 23, an example in which two rounds of outer shell regions and one round of internal region are disposed in the layer is shown.

Also in this embodiment, in Step S130 shown in FIG. 5, the data generating section 102 specifies the gap region by analyzing the arrangement and width of each partial path based on the first data including the outer shell shaping data and the internal shaping data. The data generating section 102 specifies a gap portion that is a gap region sandwiched by the partial paths and satisfies the following relationship (2).

$$W > Smax - Ss \quad (2)$$

W is a width of the gap region, Ss is a reference width of the shaping material to be deposited in each partial path, and Smax is a maximum width of the shaping material depositable in each partial path by controlling the opening and closing mechanism 70. Provided that W is preferably smaller than the reference width Ss.

According to the above relationship (2), a gap region which is not completely filled up even if the width of the partial path with the reference width Ss adjacent to one side of the gap region is expanded to the maximum width Smax is specified. In the middle part of FIG. 23, an example in which a gap portion G2 with a width W2 that satisfies the above relationship (2) is specified is shown. The width W2 is a width larger than the width W1 shown in FIG. 6.

In this embodiment, when the gap region GA that satisfies the above relationship (2) is specified in Step S130 shown in FIG. 5, the data generating section 102 divides the gap region GA into divided gap regions DA1 and DA2 as shown in the middle part of FIG. 23 in Step S150 shown in FIG. 5. Then, the data generating section 102 generates the second data from the first data by changing the ejection control data corresponding to each of the partial paths so as to increase the width of the shaping material to be deposited above the stage 210 in the partial paths at both sides sandwiching the divided gap region as shown in the lower part of FIG. 23 in the data changing process in Step S160 shown in FIG. 5. In the example shown in FIG. 23, the data generating section 102 increases the ejection amount represented by the ejection control data so as to increase the width of each of the partial paths at both sides sandwiching the divided gap regions DA1 and DA2 from the reference width Ss to a width obtained by adding one half of the width W2 of the gap portion to the reference width Ss. According to this, the divided gap regions DA1 and DA2 can be filled up by increasing the width of each of the partial paths at both sides sandwiching the regions.

According to the fourth embodiment described above, a divided gap region having a large width can be filled up by increasing the width of the shaping material to be deposited in the two partial paths sandwiching the divided gap region. That is, when a divided gap region is not completely filled up only by increasing the width of a partial path at one side adjacent to the divided gap region, the divided gap region can be filled up by also increasing the width of the partial path at the other side. Accordingly, the porosity of the three-dimensional shaped article can be effectively decreased.

E. Fifth Embodiment

Figure 24:
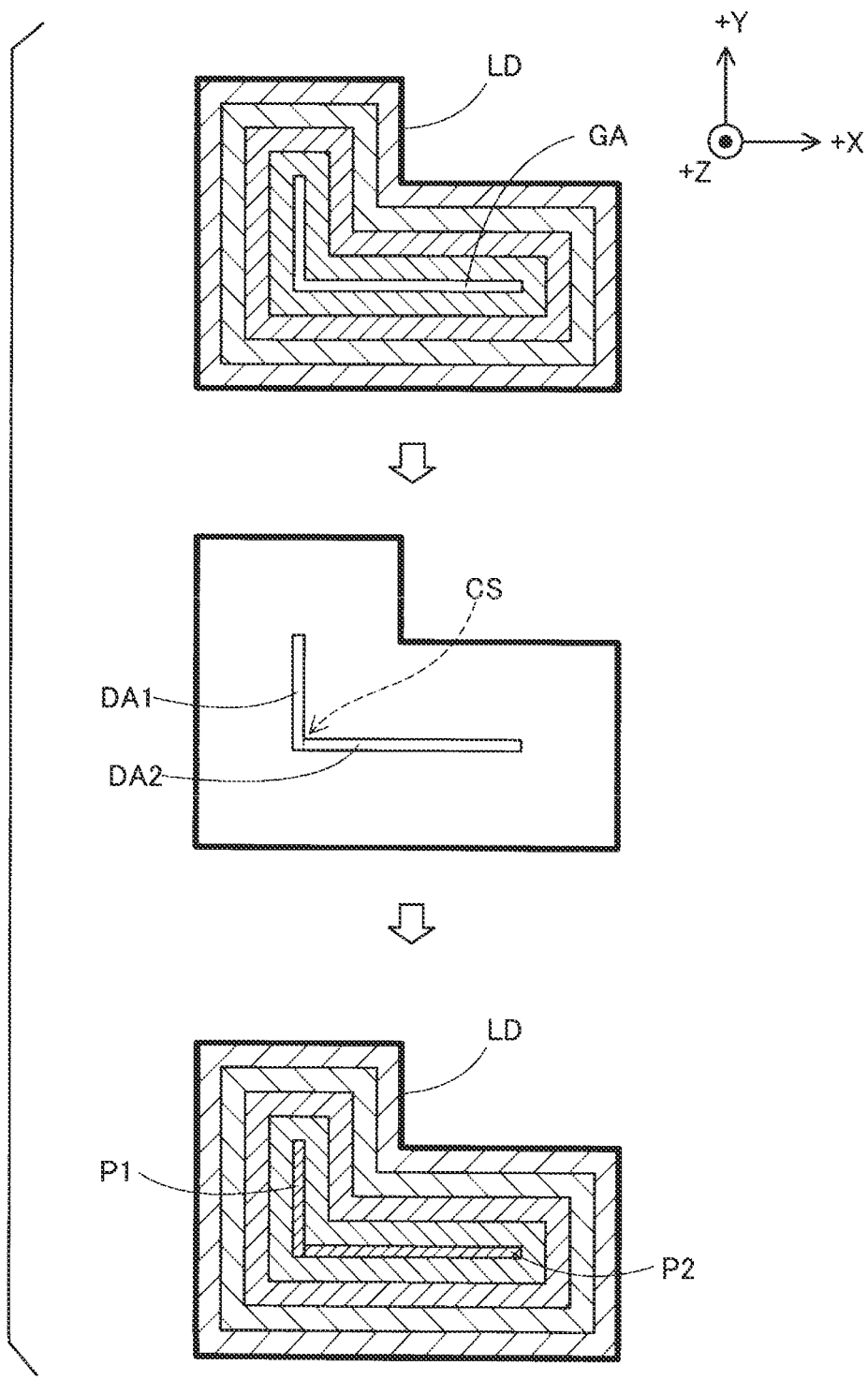
FIG. 24 is an explanatory view of a shaping data generating process in a fifth embodiment.

FIG. 24 is an explanatory view of a shaping data generating process in a fifth embodiment. In the above respective embodiments, the divided gap region is filled up by increasing the line width of a partial path adjacent to the divided gap region. On the other hand, in the fifth embodiment, the second data are generated from the first data by adding a new partial path passing through the divided gap region to the path data.

In the upper part and the middle part of FIG. 24, a gap region GA similar to the gap region shown in FIG. 6 is shown. In this embodiment, the data generating section 102 generates the second data by dividing the gap region GA into divided gap regions DA1 and DA2 as shown in the middle part of FIG. 24 in Step S150 in the shaping data generating process shown in FIG. 5, and thereafter adding new partial paths P1 and P2 for filling up the divided gap regions DA1 and DA2, respectively, as shown in the lower part of FIG. 24 to the first data in the data changing process in Step S160 shown in FIG. 5.

According to the fifth embodiment described above, a gap is filled up by adding a new partial path for a divided gap region, and therefore, the gap can be filled up by an easy process.

In this embodiment, when the width of the divided gap region changes, the second data may be generated by adjusting the line width of the partial path to be newly added according to the change in the width of the divided gap region as shown in FIG. 7. According to this, the gap region can be more accurately filled up.

F. Other Embodiments (F-1) In the above embodiment, the data generating section 102 fills up a divided gap region by increasing the line width of a partial path whose path length is longer out of two partial paths adjacent so as to sandwich the divided gap region. On the other hand, for example, when one partial path out of two partial paths adjacent so as to sandwich the divided gap region exists in the outer shell region and the other partial path exists in the internal region, the data generating section 102 may generate the second data by changing the ejection control data so as to increase the line width of the other partial path, that is, the partial path existing in the internal region in the above-mentioned data changing process. By preferentially increasing the line width of the partial path existing in the internal region in this manner, deformation of the external shape of the three-dimensional shaped article due to the increase in the line width of the partial path can be suppressed.

(F-2) In the above embodiment, the data generating section 102 fills up a divided gap region by increasing the line width of a partial path whose path length is longer out of two partial paths adjacent so as to sandwich the divided gap region. On the other hand, the data generating section 102 may increase the line width of a partial path whose path length is shorter out of the two partial paths. In addition, the data generating section 102 may increase the line width of a partial path having a predetermined directional relationship with the divided gap region, for example, a partial path adjacent in the −X direction side or in the −Y direction side out of the two partial paths.

(F-3) In the above embodiment, the data generating section 102 fills up a gap region existing in the internal region of the three-dimensional shaped article after dividing the gap region. On the other hand, the data generating section 102 may fill up a gap region formed in the outer shell region of the three-dimensional shaped article after dividing the gap region. Further, the data generating section 102 may fill up a gap region formed between the internal region and the outer shell region after dividing the gap region.

(F-4) In the above embodiment, the outer shell region of the three-dimensional shaped article is shaped by the outer shell shaping data and the internal region is shaped by the internal shaping data. On the other hand, the shaping data need not be discriminated between the outer shell shaping data and the internal shaping data. The three-dimensional shaped article may be shaped by a single type of shaping data.

(F-5) In the above embodiment, in the ejection control data included in the shaping data, information representing the ejection amount of the shaping material is included, and by increasing the ejection amount, the width of the shaping material to be deposited on the stage 210 is increased. On the other hand, in the ejection control data, moving speed information representing the moving speed of the ejection section 60 may be included. In this case, in the data changing process shown in Step S160 of FIG. 5, by decreasing the moving speed associated with the partial path, the width of the shaping material to be deposited on the stage 210 can be increased. In this case, when shaping each partial path, it is preferred that the amount of the shaping material to be ejected per unit time is constant. However, it is also possible to adjust the width of the shaping material to be deposited on the stage 210 by adjusting both the ejection amount of the shaping material and the moving speed of the ejection section 60.

(F-6) In the above embodiment, the shaping section 110 plasticizes the material by the flat screw 40. On the other hand, the shaping section 110 may plasticize the material by, for example, rotating an in-line screw. Further, as the shaping section 110, a head to be used in a fused deposition modeling method may be adopted.

(F-7) In the above embodiment, the opening and closing mechanism 70 may be constituted by a mechanism using a plunger in which a piston protrudes into the flow channel 65 and blocks the flow channel 65 or a mechanism using a shutter that moves in a direction crossing the flow channel 65 and blocks the flow channel 65. The opening and closing mechanism 70 may be constituted by two or more of the butterfly valve in the above-mentioned embodiment, and the shutter mechanism and the plunger mechanism described above in combination. In addition, the ejection amount of the shaping material may be controlled by controlling the rotational speed of the flat screw 40 instead of the opening and closing mechanism 70.

(F-8) In the above embodiment, as the raw material to be supplied to the material supply section 20, a material of an ABS resin in a pellet form is used. On the other hand, the three-dimensional shaping apparatus 100 can shape the three-dimensional shaped article using any of various materials such as a material having thermoplasticity, a metal material, and a ceramic material as a main material. Here, the "main material" means a material serving as a main component for forming the shape of the three-dimensional shaped article and refers to a material whose content ratio is 50 wt % or more in the three-dimensional shaped article. In the above-mentioned shaping material, a material obtained by melting such a main material singly, and a material formed into a paste by melting some components contained together with the main material are included.

When a material having thermoplasticity is used as the main material, the shaping material is formed by plasticizing the material in the shaping material forming section 30. The "plasticizing" means melting by applying heat to a material having thermoplasticity.

As the material having thermoplasticity, for example, the following thermoplastic resin materials can be used.

Examples of Thermoplastic Resin Material general-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polyether ether ketone (PEEK), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyether ether ketone In the material having thermoplasticity, a pigment, a metal, a ceramic, or other than these, an additive such as a wax, a flame retardant, an antioxidant, or a heat stabilizer, or the like may be mixed. The material having thermoplasticity is plasticized and transformed into a molten state by the rotation of the flat screw 40 and heating by the heater 58 in the shaping material forming section 30. The shaping material formed by melting the material having thermoplasticity is cured by decreasing the temperature after being ejected from the nozzle 61.

The material having thermoplasticity is desirably injected from the nozzle 61 in a completely molten state by being heated to a temperature equal to or higher than the glass transition point thereof. For example, an ABS resin has a glass transition point of about 120° C., and the temperature thereof when it is injected from the nozzle 61 is desirably about 200° C. In order to inject the shaping material in a high temperature state in this manner, a heater may be provided around the nozzle 61.

In the three-dimensional shaping apparatus 100, in place of the above-mentioned material having thermoplasticity, for example, the following metal material may be used as the main material. In this case, it is desirable that a component that melts when forming the shaping material is mixed in a powder material obtained by pulverizing the following metal material into a powder, and the resulting material is fed to the shaping material forming section 30 as the raw material.

Examples of Metal Material single metals of magnesium (Mg), iron (Fe), cobalt (Co), chromium (Cr), aluminum (Al), titanium (Ti), copper (Cu), and nickel (Ni), or alloys containing one or more of these metals Examples of Alloy a maraging steel, a stainless steel, cobalt-chromium-molybdenum, a titanium alloy, a nickel alloy, an aluminum alloy, a cobalt alloy, and a cobalt-chromium alloy In the three-dimensional shaping apparatus 100, in place of the above-mentioned metal material, a ceramic material can be used as the main material. As the ceramic material, for example, an oxide ceramic such as silicon dioxide, titanium dioxide, aluminum oxide, or zirconium oxide, a non-oxide ceramic such as aluminum nitride, or the like can be used. When a metal material or a ceramic material as described above is used as the main material, the shaping material disposed at the stage 210 may be cured by irradiation with a laser or sintering with hot air or the like.

The powder material of the metal material or the ceramic material to be fed to the material supply section 20 as the raw material may be a mixed material obtained by mixing multiple types of single metal powders or alloy powders or ceramic material powders. Further, the powder material of the metal material or the ceramic material may be coated with, for example, a thermoplastic resin as exemplified above or any other thermoplastic resin. In this case, the material may be configured to exhibit fluidity by melting the thermoplastic resin in the shaping material forming section 30.

To the powder material of the metal material or the ceramic material to be fed to the material supply section 20 as the raw material, for example, a solvent as described below can also be added. As the solvent, one type or a combination of two or more types selected from the following solvents can be used.

Examples of Solvent water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; tetra-alkyl ammonium acetates (for example, tetra-butyl ammonium acetate, etc.); ionic liquids such as butyl carbitol acetate, and the like In addition thereto, for example, a binder as described below can also be added to the powder material of the metal material or the ceramic material to be fed to the material supply section 20 as the raw material.

Examples of Binder an acrylic resin, an epoxy resin, a silicone resin, a cellulosic resin, or another synthetic resin, or PLA (polylactic acid), PA (polyamide), PPS (polyphenylene sulfide), PEEK (polyether ether ketone), or other thermoplastic resins

G. Other Aspects

The present disclosure is not limited to the above-mentioned embodiments, but can be realized in various configurations without departing from the gist thereof. For example, the technical features of the embodiments corresponding to technical features in the respective aspects described below may be appropriately replaced or combined for solving part or all of the problems described above or achieving part or all of the effects described above. Further, the technical features may be appropriately deleted unless they are described as essential features in the present specification.

(1) According to the first aspect of the present disclosure, a three-dimensional shaped article production method for producing a three-dimensional shaped article by ejecting a shaping material to a stage from an ejection section and stacking layers is provided. The production method includes a first step of dividing a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, a second step of generating second data from the first data by changing at least either of the path data and the ejection control data so as to fill up the divided gap region with the shaping material, and a third step of shaping the three-dimensional shaped article by controlling the ejection section according to the second data.

According to such an aspect, the gap region included in each layer is divided, and each of the divided gap regions is filled up with the shaping material, and therefore, even when the shape of the gap region is complicated, the gap region can be appropriately filled up, and a void portion can be prevented from remaining.

(2) In the above aspect, in the first step, the gap region may be divided so as to decrease the number of concave shapes included at the outer circumference of the gap region. According to such an aspect, the shape of each of the divided gap regions can be approximated to a simple shape, and therefore, a void portion can be effectively prevented from remaining in the gap region.

(3) In the above aspect, in the first step, the gap region may be divided until a difference between an angle from a reference line of a tangent to the concave shape at an origin of the concave shape and an angle from the reference line of the tangent to the concave shape at an end point of the concave shape becomes a predetermined value or less. According to such an aspect, the shape of each of the divided gap regions can be approximated to a simple shape, and therefore, a void portion can be effectively prevented from remaining in the gap region.

(4) In the above aspect, in the second step, the second data may be generated by changing the ejection control data so as to increase a line width of the shaping material to be deposited above the stage in the partial path that is in contact with the divided gap region. According to such an aspect, the gap can be filled up by increasing the line width of the existing partial path without adding a new partial path, and therefore, an increase in the shaping data can be suppressed.

(5) In the above aspect, the layer may include an outer shell region expressing an outer shell of the three-dimensional shaped article, and an internal region that is a region other than the outer shell region in the three-dimensional shaped article, and in the second step, when one partial path out of two partial paths that are in contact with the divided gap region so as to sandwich the divided gap region exists in the outer shell region and the other partial path exists in the internal region, the second data may be generated by changing the ejection control data so as to increase the line width of the shaping material to be deposited above the stage in the other partial path. According to such an aspect, deformation of the external shape of the three-dimensional shaped article due to the increase in the line width of the partial path can be suppressed.

(6) In the above aspect, in the second step, the second data may be generated by adjusting a line width of the partial path that is in contact with the divided gap region according to a change in the width of the divided gap region. According to such an aspect, a gap portion can be accurately filled up.

(7) In the above aspect, in the second step, the second data may be generated by adding a new partial path passing through the divided gap region to the path data. According to such an aspect, the divided gap region can be easily filled up.

(8) In the above aspect, in the second step, the second data may be generated by adjusting a line width of the new partial path according to a change in the width of the divided gap region. According to such an aspect, a gap portion can be accurately filled up.

(9) In the above aspect, when a reference width Ss of the shaping material to be deposited above the stage in each of the partial paths, a maximum width Smax of the shaping material depositable at the stage in each of the partial paths, and a width W of the gap region satisfy a relationship: W≤Smax−Ss, in the second step, the second data may be generated by changing the ejection control data so as to increase the line width of the shaping material to be deposited above the stage in either one partial path out of two partial paths sandwiching the divided gap region. According to such an aspect, the gap region can be efficiently filled up by increasing the line width of either one partial path out of two partial paths sandwiching the divided gap region.

(10) In the above aspect, when a reference width Ss of the shaping material to be deposited above the stage in each of the partial paths, a maximum width Smax of the shaping material depositable at the stage in each of the partial paths, and a width W of the gap region satisfy a relationship: W>Smax−Ss, in the second step, the second data may be generated by changing the ejection control data so as to increase the line width of the shaping material to be deposited above the stage in each of two partial paths sandwiching the divided gap region. According to such an aspect, the width of the shaping material to be deposited in both two partial paths sandwiching the divided gap region is increased, and therefore, a gap region having a large width can be filled up.

(11) According to the second aspect of the present disclosure, a three-dimensional shaping apparatus is provided. The three-dimensional shaping apparatus includes a stage, an ejection section that ejects a shaping material to the stage, a moving mechanism that moves the ejection section with respect to the stage, a data generating section that generates second data from first data, and a control unit that controls the ejection section and the moving mechanism so as to shape a three-dimensional shaped article on the stage according to the second data, wherein the data generating section divides a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, and generates the second data from the first data by changing at least either of the path data and the ejection control data so as to fill up the divided gap region with the shaping material.

(12) According to the third aspect of the present disclosure, an information processing apparatus for generating shaping data for ejecting a shaping material to a stage from an ejection section and stacking layers is provided. The information processing apparatus includes a data generating section that divides a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, and generates the shaping data from the first data by changing at least either of the path data and the ejection control data so as to fill up the divided gap region with the shaping material.

What is claimed is:

1. A three-dimensional shaped article production method for producing a three-dimensional shaped article by ejecting a shaping material to a stage from an ejection section and stacking layers, the three-dimensional shaped article production method comprising:
    a first step of dividing a gap region that is sandwiched by multiple partial paths and includes one or more concave shapes at an outer circumference based on first data so as to decrease the number of the one or more concave shapes at the outer circumference of the gap region, the first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths, the gap region being divided into at least two regions such that a total concave shape number at outer circumferences of the at least two regions is less than the number of the one or more concave shapes at the outer circumference of the gap region;
    a second step of generating second data from the first data by changing at least either of the path data and the ejection control data so as to fill up the divided gap region with the shaping material; and
    a third step of shaping the three-dimensional shaped article by controlling the ejection section according to the second data.

2. The three-dimensional shaped article production method according to claim 1, wherein
    in the first step, the gap region is divided until a difference between an angle from a reference line of a tangent to the concave shape at an origin of the concave shape and an angle from the reference line of the tangent to the concave shape at an end point of the concave shape becomes a predetermined value or less.

3. The three-dimensional shaped article production method according to claim 1, wherein
    in the second step, the second data are generated by changing the ejection control data so as to increase a line width of the shaping material to be deposited above the stage in the partial path that is in contact with the divided gap region.

4. The three-dimensional shaped article production method according to claim 3, wherein
    the layer includes an outer shell region expressing an outer shell of the three-dimensional shaped article, and an internal region that is a region other than the outer shell region in the three-dimensional shaped article, and
    in the second step, when one partial path out of two partial paths that are in contact with the divided gap region so as to sandwich the divided gap region exists in the outer shell region and the other partial path exists in the internal region, the second data are generated by changing the ejection control data so as to increase the line width of the shaping material to be deposited above the stage in the other partial path.

5. The three-dimensional shaped article production method according to claim 3, wherein
    in the second step, the second data are generated by changing the path data such that the partial path that is in contact with the divided gap region passes through a center of the shaping material after changing the line width.

6. The three-dimensional shaped article production method according to claim 3, wherein
    in the second step, the second data are generated by adjusting a line width of the partial path that is in contact with the divided gap region according to a change in the width of the divided gap region.

7. The three-dimensional shaped article production method according to claim 6, wherein
    in the second step, the partial path that is adjacent to the divided gap region is divided into a plurality of divided partial paths, and the second data are generated by adjusting a line width of each of the plurality of divided partial paths according to the change in the width of the divided gap region.

8. The three-dimensional shaped article production method according to claim 7, wherein
    in the second step, the second data are generated by changing the path data such that each of the plurality of divided partial paths passes through a center of the shaping material after changing the line width.

9. The three-dimensional shaped article production method according to claim 1, wherein
    in the second step, the second data are generated by adding a new partial path passing through the divided gap region to the path data.

10. The three-dimensional shaped article production method according to claim 9, wherein
    in the second step, the second data are generated by adjusting a line width of the new partial path according to a change in the width of the divided gap region.

11. The three-dimensional shaped article production method according to claim 1, wherein
    when a reference width $S_s$ of the shaping material to be deposited above the stage in each of the partial paths, a maximum width $S_{max}$ of the shaping material depositable at the stage in each of the partial paths, and a width $W$ of the gap region satisfy a relationship: $W \leq S_{max} - S_s$, in the second step, the second data are generated by changing the ejection control data so as to increase the line width of the shaping material to be deposited above the stage in either one partial path out of two partial paths sandwiching the divided gap region.

12. The three-dimensional shaped article production method according to claim 1, wherein
when a reference width Ss of the shaping material to be deposited above the stage in each of the partial paths, a maximum width Smax of the shaping material depositable at the stage in each of the partial paths, and a width W of the gap region satisfy a relationship: W>Smax−Ss, in the second step, the second data are generated by changing the ejection control data so as to increase the line width of the shaping material to be deposited above the stage in each of two partial paths sandwiching the divided gap region.

13. The three-dimensional shaped article production method according to claim 1, wherein
in the first step, the gap region is divided with a line segment coupling an origin of division and an end point of division,
the origin of division is one vertex of vertexes on the outer circumference of the gap region, and the one vertex forms a concave angle, and
an end point of division is a different vertex of the vertexes on the outer circumference of the gap region, the different vertex is a start point or an end point of a reverse vector that is reversed with respect to a vector with the origin of division as a start point, and the different vertex is a vertex positioned such that a distance to the origin of division is shortest among a vertex candidate for the end point of division.

14. The three-dimensional shaped article production method according to claim 1, wherein
in the second step, the second data are generated by changing the ejection control data so as to increase a line width of one partial path that has a longer length out of two partial paths adjacent to the divided gap region so as to sandwich the divided gap region.

15. A three-dimensional shaped article production method for producing a three-dimensional shaped article by ejecting a shaping material to a stage from an ejection section and stacking layers, the three-dimensional shaped article production method comprising:
a first step of dividing a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths;
a second step of generating second data from the first data by changing at least either of the path data and the ejection control data so as to fill up the divided gap region with the shaping material; and
a third step of shaping the three-dimensional shaped article by controlling the ejection section according to the second data, wherein
in the first step, the gap region is divided until a difference between an angle from a reference line of a tangent to the concave shape at an origin of the concave shape and an angle from the reference line of the tangent to the concave shape at an end point of the concave shape becomes a predetermined value or less.

16. A three-dimensional shaped article production method for producing a three-dimensional shaped article by ejecting a shaping material to a stage from an ejection section and stacking layers, the three-dimensional shaped article production method comprising:
a first step of dividing a gap region that is a gap region sandwiched by multiple partial paths and includes one or multiple concave shapes at an outer circumference based on first data having path data representing a path in which the ejection section moves while ejecting the shaping material by the multiple partial paths, and having ejection control data including at least either of ejection amount information representing an ejection amount of the shaping material in each of the partial paths and moving speed information representing a moving speed of the ejection section in each of the partial paths;
speed information representing a moving speed of the ejection section in each of the partial paths;
a second step of generating second data from the first data by changing at least either of the path data and the ejection control data so as to fill up the divided gap region with the shaping material; and
a third step of shaping the three-dimensional shaped article by controlling the ejection section according to the second data, wherein
when a reference width Ss of the shaping material to be deposited above the stage in each of the partial paths, a maximum width Smax of the shaping material depositable at the stage in each of the partial paths, and a width W of the gap region satisfy a relationship: W≤Smax−Ss, in the second step, the second data are generated by changing the ejection control data so as to increase the line width of the shaping material to be deposited above the stage in either one partial path out of two partial paths sandwiching the divided gap region, and when the reference width Ss, the maximum width Smax, and the width W satisfy a relationship: W>Smax−Ss, in the second step, the second data are generated by changing the ejection control data so as to increase the line width of the shaping material to be deposited above the stage in each of two partial paths sandwiching the divided gap region.

* * * * *